US011192577B2

(12) United States Patent
Yagyu

(10) Patent No.: US 11,192,577 B2
(45) Date of Patent: Dec. 7, 2021

(54) POWER STEERING DEVICE

(71) Applicant: KYB Corporation, Tokyo (JP)

(72) Inventor: Takaya Yagyu, Gifu (JP)

(73) Assignee: KYB Corporation, Tokyo (JP)

( * ) Notice: Subject to any disclaimer, the term of this patent is extended or adjusted under 35 U.S.C. 154(b) by 122 days.

(21) Appl. No.: 16/638,474

(22) PCT Filed: Jul. 24, 2018

(86) PCT No.: PCT/JP2018/027743
§ 371 (c)(1),
(2) Date: Feb. 12, 2020

(87) PCT Pub. No.: WO2019/044281
PCT Pub. Date: Mar. 7, 2019

(65) Prior Publication Data
US 2021/0122409 A1 Apr. 29, 2021

(30) Foreign Application Priority Data
Aug. 31, 2017 (JP) .............................. JP2017-167732

(51) Int. Cl.
*B62D 5/04* (2006.01)
*F16H 1/16* (2006.01)
(Continued)

(52) U.S. Cl.
CPC .............. *B62D 5/0409* (2013.01); *F16H 1/16* (2013.01); *F16H 57/021* (2013.01); *F16H 2057/0213* (2013.01); *F16H 2057/127* (2013.01)

(58) Field of Classification Search
CPC ....... B62D 5/0409; F16H 1/16; F16H 57/021; F16H 2057/0213; F16H 2057/127
See application file for complete search history.

(56) References Cited

U.S. PATENT DOCUMENTS

| 9,415,799 B2* | 8/2016 | Yoshikawa .............. B62D 5/04 |
| 2008/0006472 A1* | 1/2008 | Song .................... B62D 5/0409 180/444 |

(Continued)

FOREIGN PATENT DOCUMENTS

| JP | 2011-255810 A | 12/2011 |
| JP | 2013-71681 A | 4/2013 |

(Continued)

OTHER PUBLICATIONS

International Search Report and Written Opinion in PCT/JP2018/027743, dated Oct. 9, 2018. 14pp.

*Primary Examiner* — Tony H Winner
(74) *Attorney, Agent, or Firm* — Hauptman Ham, LLP

(57) ABSTRACT

A power steering device includes a bearing configured to rotatably support the tip side of a worm shaft, the gear case housing the worm shaft and a holder housed in a housing hole provided in the gear case and configured to house the second bearing. The holder includes the first holder having a holding part configured to hold the outer periphery of the bearing and the opening part configured to expose a part of the outer periphery of the bearing, the second holder having a guide part configured to guide a movement of the bearing toward a worm wheel as the outer periphery of the bearing comes into contact with the guide part through the opening part and a spring configured to bias the bearing toward the worm wheel via the first holder.

6 Claims, 26 Drawing Sheets

(51) Int. Cl.
*F16H 57/021* (2012.01)
*F16H 57/12* (2006.01)

(56) References Cited

U.S. PATENT DOCUMENTS

| | | | |
|---|---|---|---|
| 2014/0174843 A1 | 6/2014 | Kimoto | |
| 2015/0107384 A1* | 4/2015 | Kwon | B62D 3/04 |
| | | | 74/89.14 |
| 2016/0318544 A1 | 11/2016 | Kawamura | |
| 2018/0156325 A1 | 6/2018 | Segawa | |
| 2018/0216720 A1* | 8/2018 | Kim | F16C 1/00 |
| 2020/0116249 A1* | 4/2020 | Cho | B62D 5/0454 |

FOREIGN PATENT DOCUMENTS

| | | |
|---|---|---|
| JP | 2014126059 A | 7/2014 |
| JP | 2015-81669 A | 4/2015 |
| JP | 2016211615 A | 12/2016 |
| WO | 2017/002393 A1 | 1/2017 |

\* cited by examiner

POWER STEERING DEVICE

RELATED APPLICATIONS

The present application is a National Phase of International Application Number PCT/JP2018/027743, filed Jul. 24, 2018, which claims priority to JP2017-167732 filed Aug. 31, 2017.

TECHNICAL FIELD

The present invention relates to a power steering device.

BACKGROUND ART

JP2013-71681A discloses an electric power steering device configured such that a drive gear to be driven by an electric motor is rotatably supported in a gear housing and a driven gear meshed with the drive gear is fixed to a steering shaft, and including a spring for applying a preload to a meshed part of the drive gear and the driven gear and preloading means for biasing a bearing of the drive gear in a predetermined preload direction.

In this electric power steering device, the preloading means includes a bearing case for housing the bearing, a guide case provided on the inner periphery with a guide hole for housing the bearing case, and the spring. The guide case guides the bearing case such that the bearing case moves in the predetermined preload direction of the bearing.

SUMMARY OF INVENTION

In the power steering device of JP2013-71681A, the bearing case housing the bearing is guided by the guide hole of the guide case, whereby a movement of a worm shaft toward a worm wheel is guided. Thus, the dimensional accuracy of both the bearing case and the guide case affects the meshing accuracy of the worm shaft and the worm wheel.

The present invention aims to improve the meshing accuracy of a worm wheel and a worm shaft in a power steering device.

According to one aspect of the present invention, a power steering device includes: a worm shaft configured to rotate as an electric motor is driven; a worm wheel meshed with the worm shaft; a bearing configured to rotatably support a tip side of the worm shaft; a gear case configured to house the worm shaft; and a holder housed in a housing hole provided in the gear case, the holder housing the bearing. The holder includes: a first holder having a holding part and an opening part, the holding part being configured to hold an outer periphery of the bearing, the opening part being configured to expose a part of the outer periphery of the bearing; a second holder having a guide part configured to guide a movement of the bearing toward the worm wheel as the outer periphery of the bearing comes into contact with the guide part through the opening part; and a biasing member configured to bias the bearing toward the worm wheel via the first holder.

DESCRIPTION OF EMBODIMENTS

Hereinafter, embodiments of the present invention are described with reference to the drawings.

First Embodiment

A power steering device 100 according to a first embodiment of the present invention is described with reference to FIGS. 1 to 17.

The power steering device 100 is a device installed in a vehicle and configured to assist a steering force applied to a steering wheel by a driver.

Figure 1:
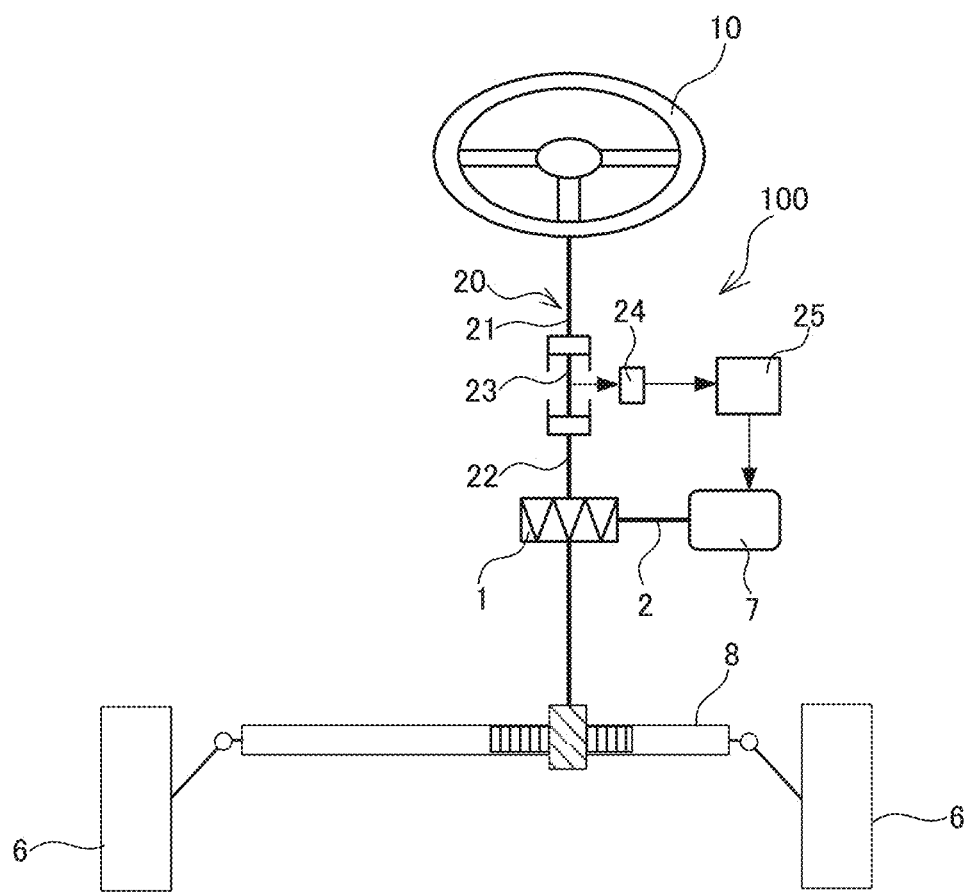
FIG. 1 is a configuration diagram of a power steering device according to a first embodiment of the present invention.
Figure 2:
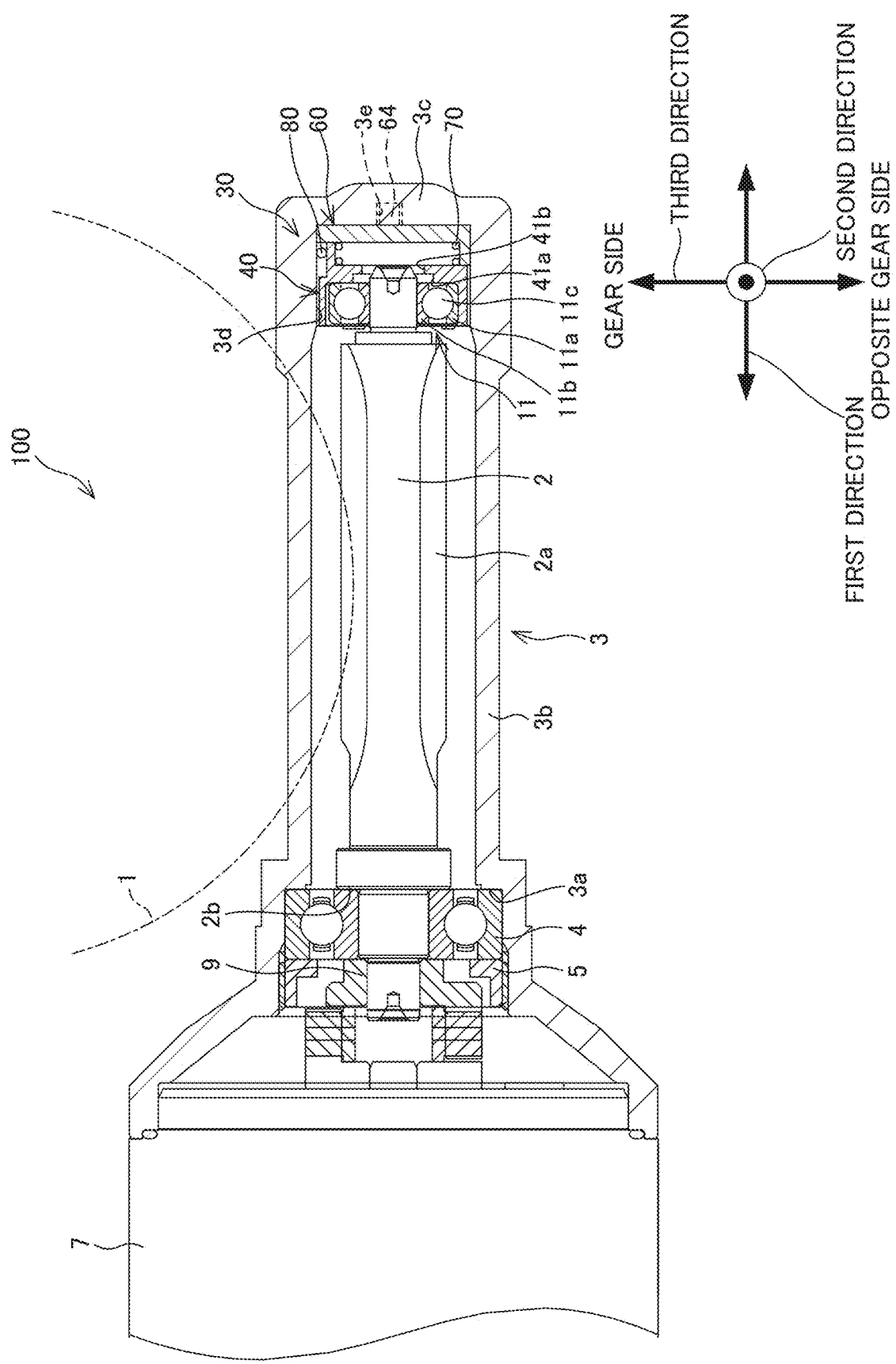
FIG. 2 is a sectional view of the power steering device according to the first embodiment of the present invention.

As shown in FIGS. 1 and 2, the power steering device 100 includes a worm shaft 2 coupled to an output shaft of an electric motor 7 and configured to rotate as the electric motor 7 is driven, and a worm wheel 1 meshed with the worm shaft 2 and configured to transmit a rotational force of the electric motor 7 to a rack shaft 8 for turning wheels 6. As the electric motor 7 is driven, the worm shaft 2 rotates and the rotation of the worm shaft 2 is decelerated and transmitted to the worm wheel 1. A worm reducer is constituted by the worm wheel 1 and the worm shaft 2.

As shown in FIG. 1, a steering shaft 20 is coupled to a steering wheel 10 and the steering shaft 20 rotates according to the rotation of the steering wheel 10. The steering shaft 20 includes an input shaft 21 linked to the steering wheel 10, an output shaft 22 linked to the rack shaft 8 and a torsion bar 23 coupling the input shaft 21 and the output shaft 22. The worm wheel 1 is provided on the output shaft 22.

The power steering device 100 further includes a torque sensor 24 for detecting a steering torque acting on the torsion bar 23 by relative rotation of the input shaft 21 and the output shaft 22 associated with a steering operation by the driver, and a controller 25 for controlling the drive of the electric motor 7 on the base of the steering torque detected by the torque sensor 24. A torque output from the electric motor 7 is transmitted from the worm shaft 2 to the worm wheel 1 and given as an assist torque to the output shaft 22. In this way, the power steering device 100 controls the drive of the electric motor 7 by the controller 25 to assist the steering operation of the driver on the base of a detection result of the torque sensor 24.

As shown in FIG. 2, the worm shaft 2 is housed in a gear case 3 made of metal and the electric motor 7 is mounted on the gear case 3. The gear case 3 has a peripheral wall 3b surrounding the worm shaft 2 and a bottom wall 3c facing the tip of the worm shaft 2. The peripheral wall 3b and the bottom wall 3c are integrally formed. As just described, the gear case 3 is excellent in waterproofness by being configured not to close an opening part 43 in a bottom part by a lid, but having a bag-like structure. It should be noted that the gear case 3 may be made of resin. Further, the gear case 3 may be structured to seal an opening end part of the peripheral wall 3b by a lid instead of the integral structure of the peripheral wall 3b and the bottom wall 3c.

A tooth part 2a meshed with a tooth part of the worm wheel 1 is formed on a part of the worm shaft 2. The opening part 43 is formed at a position corresponding to the tooth part 2a in the peripheral wall 3b of the gear case 3 on the side of the worm shaft 2, and the tooth part 2a of the worm shaft 2 and the tooth part of the worm wheel 1 are meshed through the opening part 43.

A base end side of the worm shaft 2 on the side of the electric motor 7 is rotatably supported by a first bearing 4. The first bearing 4 is a ball bearing in which balls are interposed between annular inner and outer rings. The outer ring of the first bearing 4 is sandwiched between a step part 3a formed in the gear case 3 and a lock nut 5 fastened in the gear case 3. The inner ring of the first bearing 4 is sandwiched between a step part 2b of the worm shaft 2 and a joint 9 press-fitted to an end part of the worm shaft 2. In this way, a movement of the worm shaft 2 in an axial direction is restricted.

A tip side of the worm shaft 2 is rotatably supported by a second bearing 11. The second bearing 11 is a ball bearing in which balls 11c are interposed between annular outer and inner rings 11a, 11b. The second bearing 11 is housed in a holder 30 and the holder 30 is arranged in a housing hole 3d formed in a bottom side of the gear case 3 and having a circular inner peripheral surface.

A specific configuration of the holder 30 is described below.

It should be noted that, in the following description, a direction along a center axis of the worm shaft 2 (center axis of the second bearing 11) (lateral direction in FIG. 2) is also referred to as a "first direction", a direction along the center axis of the worm wheel 1 (direction perpendicular to the plane of FIG. 2) is also referred to as a "second direction" and a direction perpendicular to both the center axis of the worm shaft 2 and the center axis of the worm wheel 1 (vertical direction in FIG. 2) is also referred as a "third direction" as shown in FIG. 2. That is, the first, second and third directions are directions along orthogonal three axes orthogonal to each other. Further, one side (upper side in FIG. 2) on the side of the worm wheel 1 viewed from the second bearing 11 in the third direction is referred to as a "gear side" and the other side (lower side in FIG. 2) opposite to the gear side is referred to as an "opposite gear side".

As mainly shown in FIGS. 2 and 3, the holder 30 includes a first holder 40 having a holding part 42 for holding the second bearing 11, a second holder 60 having a guide part 62 for guiding a movement of the second bearing 11 toward the worm wheel 1, a coil spring (hereinafter, merely referred to as a "spring") 70 serving as a biasing member for biasing the second bearing 11 toward the worm wheel 1 via the first holder 40, and an arcuate clip 80 serving as a locking member for locking and integrating the first holder 40 and the second holder 60. The first and second holders 40, 60 are made of resin.

Figure 4:
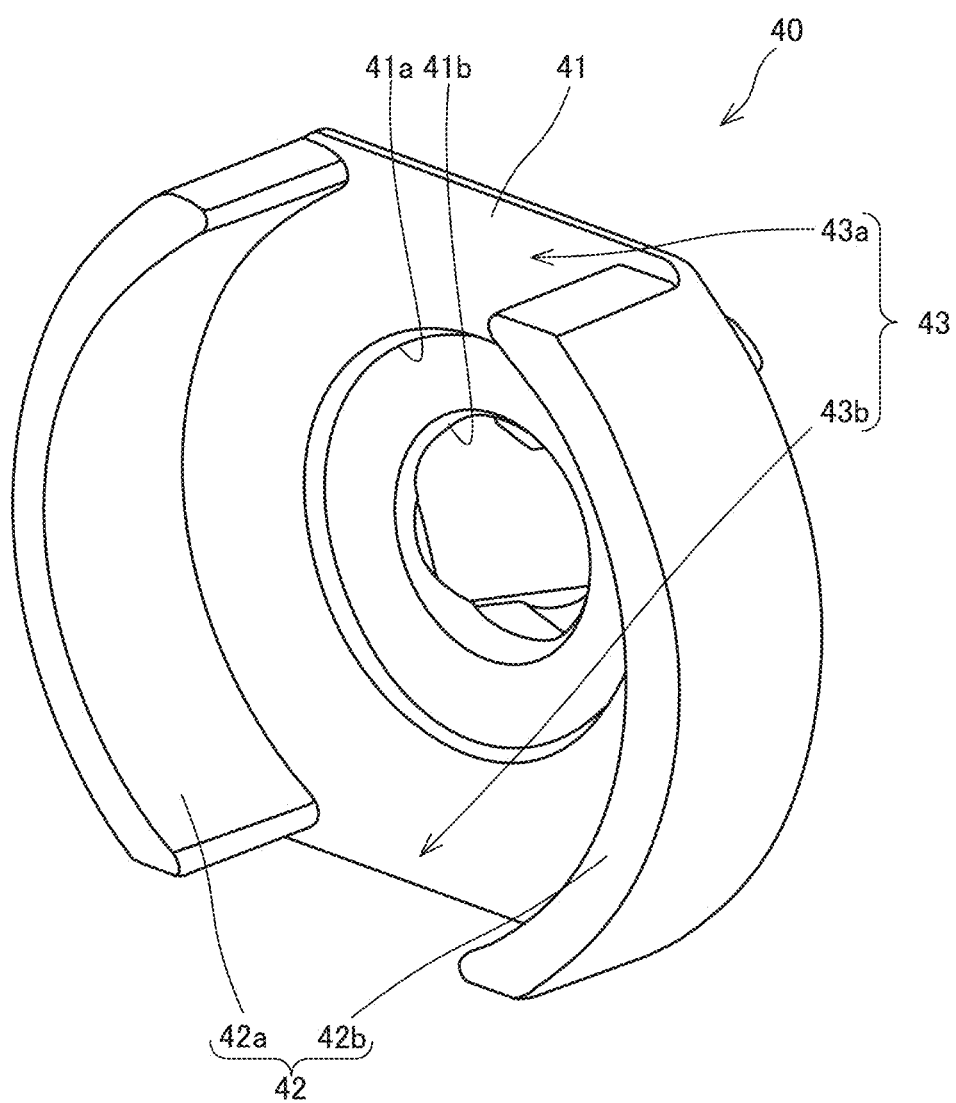
FIG. 4 is a front side perspective view of a first holder according to the first embodiment of the present invention.
Figure 4:
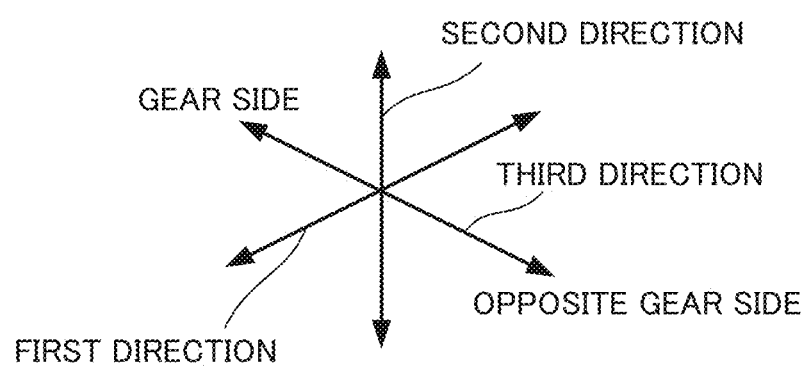
Figure 5:
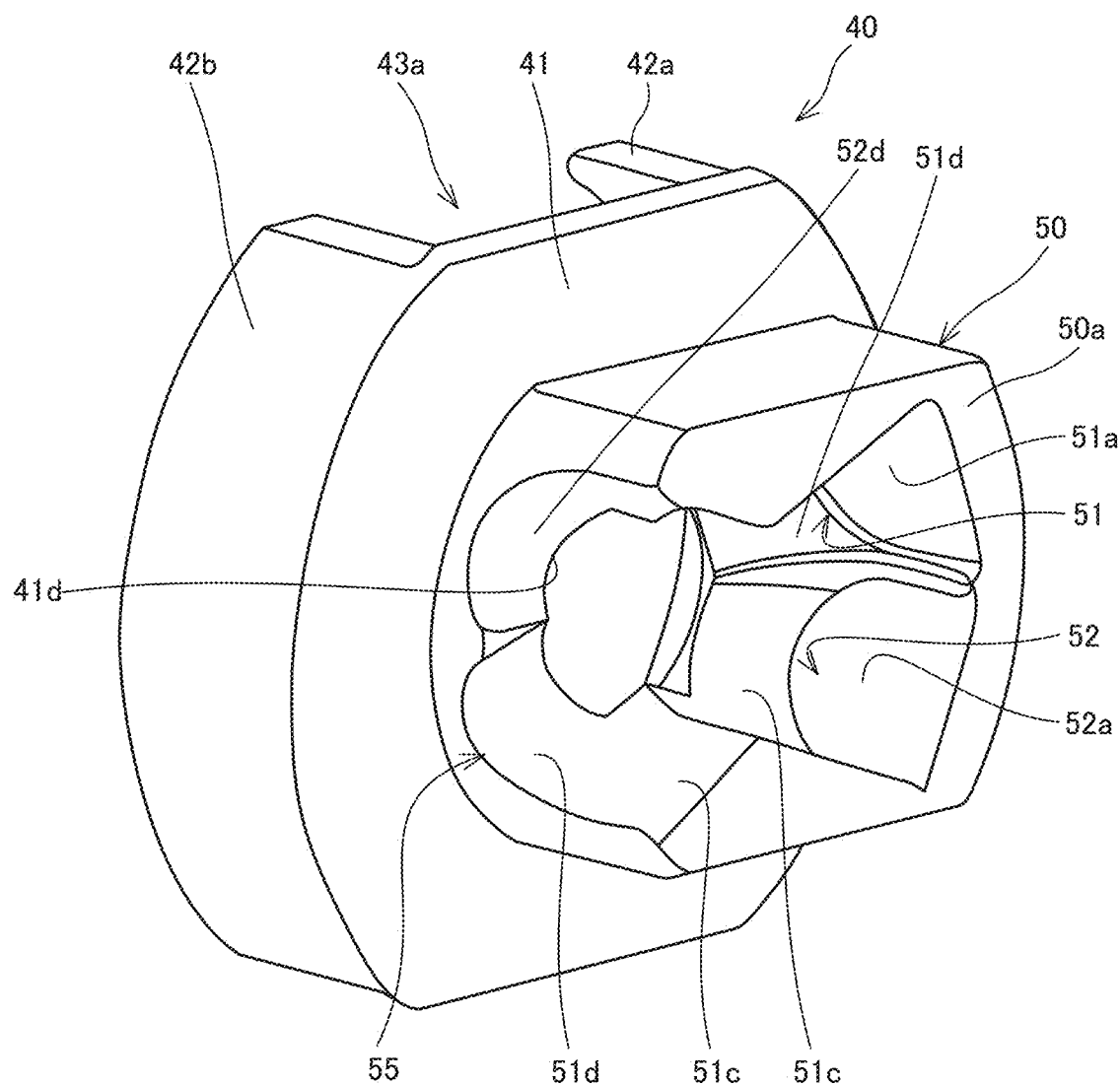
FIG. 5 is a back side perspective view of the first holder according to the first embodiment of the present invention.
Figure 5:
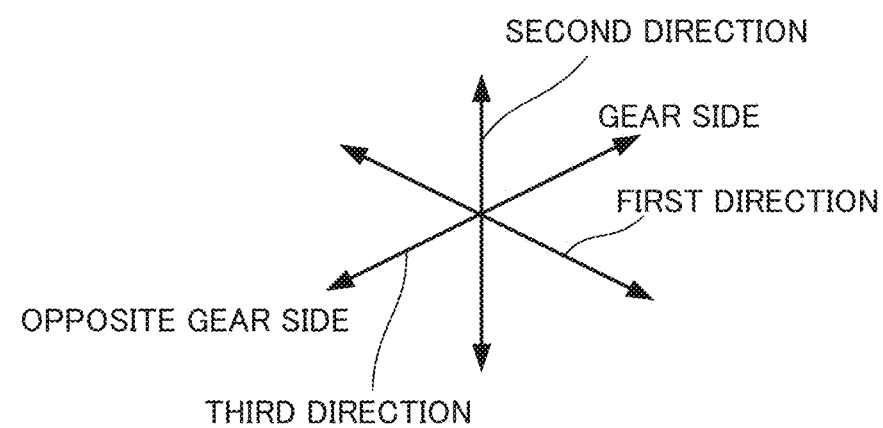
Figure 6:
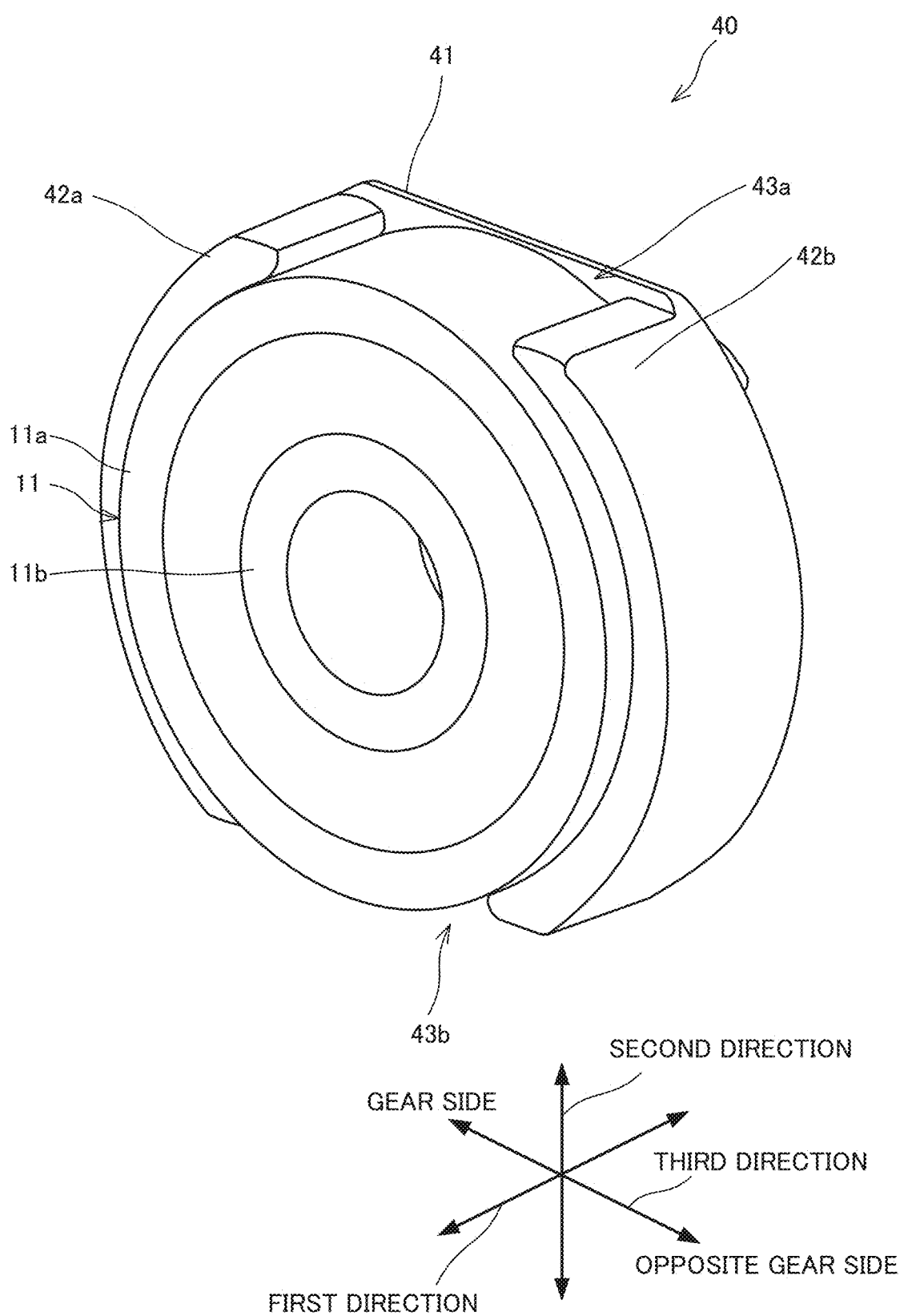
FIG. 6 is a front side perspective view of the first holder and a bearing according to the first embodiment of the present invention.

As shown in FIGS. 4 to 6, the first holder 40 includes a plate-like first holder body part 41, the holding part 42 provided on the first holder body part 41, the opening part 43 for exposing parts of the outer peripheral surface of the second bearing 11, and a supporting part 50 formed with a spring housing recess part 55 for housing the spring 70.

The first holder body part 41 is in the form of a plate having a so-called width across flat shape formed with a pair of parallel surfaces parallel to each other. The first holder body part 41 includes a circular recess part 41a provided in a center and a center hole 41b formed in a bottom part of the recess part 41a and penetrating through the first holder body part 41 in a thickness direction (first direction).

As shown in FIG. 2, the recess part 41a is provided to face the inner ring 11b of the second bearing 11 and formed to have a larger inner diameter than the inner ring 11b. The contact of the inner ring 11b of the second bearing 11 and the first holder body part 41 is avoided by the recess part 41a. In this way, the rotation of the inner ring 11b of the second bearing 11 is not obstructed by the first holder 40 and the worm shaft 2 can smoothly rotate.

The center hole 41b is formed to have a larger inner diameter than a diameter of the end part of the worm shaft 2 supported by the second bearing 11, and the end part of the worm shaft 2 is partially inserted therein. By inserting the end part of the worm shaft 2 into the first holder body part 41 of the holder 30, the power steering device 100 can be reduced in size in the axial direction of the worm shaft 2.

As shown in FIGS. 4 to 6, the holding part 42 is composed of a first holding part 42a and a second holding part 42b provided to face each other across the center axis of the second bearing 11. The first and second holding parts 42a, 42b are provided to project in the same direction from the first holder body part 41 along the center axis of the second bearing 11 (along the first direction). The first and second holding parts 42a, 42b face each other in the third direction. Radially inner sides of the first and second holding parts 42a, 42b are formed into an arc shape corresponding to the outer ring 11a of the second bearing 11, and radially outer sides thereof are formed into an arc shape corresponding to the inner peripheral surface of the housing hole 3d. The first and second holding parts 42a, 42b hold parts of the outer peripheral surface of the outer ring 11a of the second bearing 11 housed inside thereof. The first holding part 42a is provided relatively on the gear side, and the second holding part 42b is provided relatively on the opposite gear side.

The opening part 43 is composed of a first opening part 43a and a second opening part 43b defined by the first and second holding parts 42a, 42b in a circumferential direction of the second bearing 11. The first and second opening parts 43a, 43b are provided on both sides in the second direction with respect to the center axis of the second bearing 11. The first and second opening parts 43a, 43b communicate with an inner space defined by the first and second holding parts 42a, 42b to house the second bearing 11. In this way, as shown in FIG. 6, the first and second opening parts 43a, 43b expose parts of the outer peripheral surface of the outer ring 11a of the second bearing 11 held by the first and second holding parts 42a, 42b to outside.

As shown in FIG. 5, the supporting part 50 is provided on a surface of the first holder body part 41 opposite to the holding part 42. A cross-section of the supporting part 50 perpendicular to the first direction is formed into a width across flat shape having a pair of parallel surfaces (see FIG. 10). The supporting part 50 includes the spring housing recess part 55 for housing the spring 70. The spring 70 is provided on a side of the first holder body part 41 opposite to the second bearing 11 held by the first and second holding parts 42a, 42b. Thus, the spring 70 is provided side by side with the second bearing 11 in the axial direction (first direction).

Figure 7:
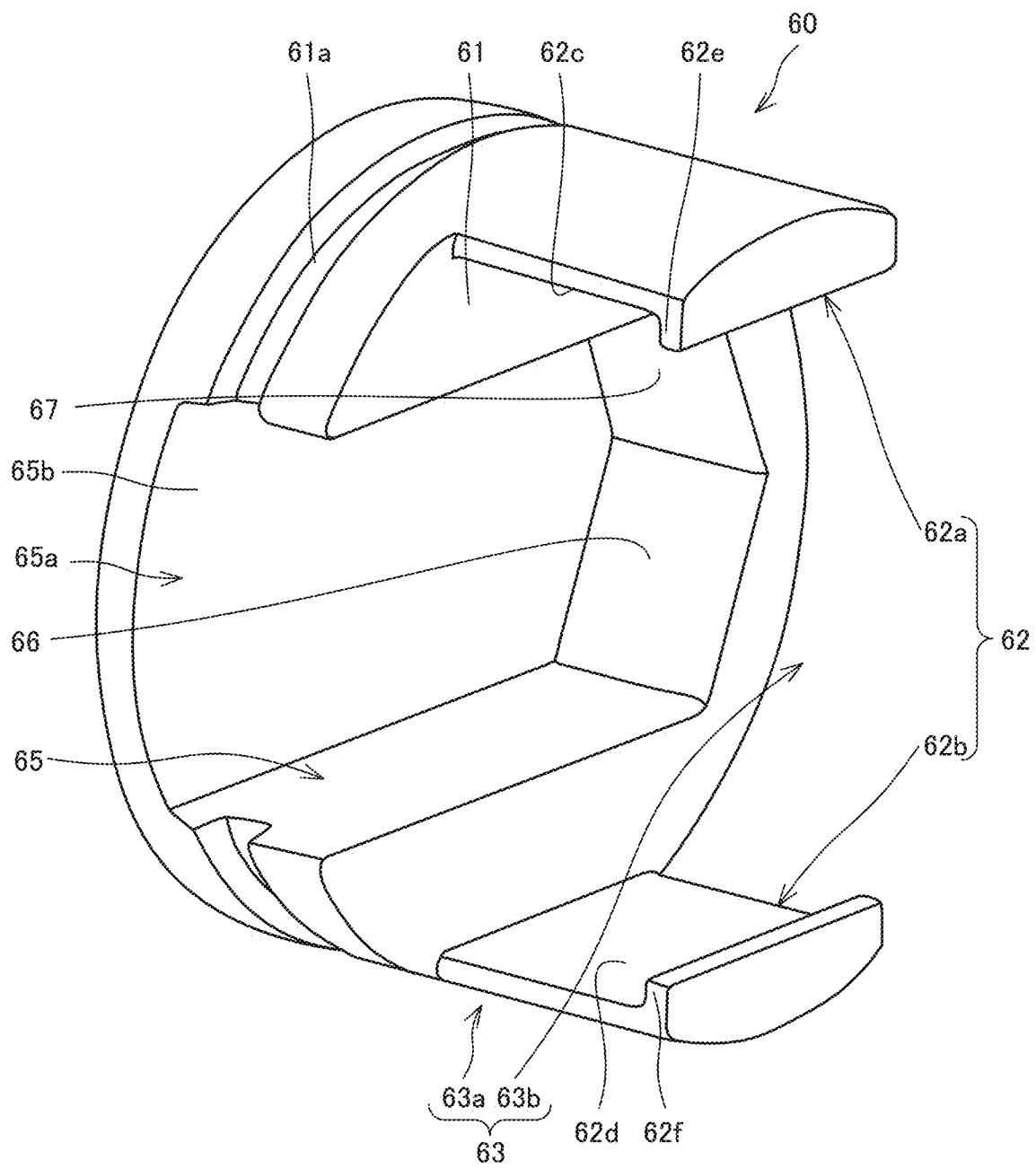
FIG. 7 is a front side perspective view of a second holder according to the first embodiment of the present invention.
Figure 7:
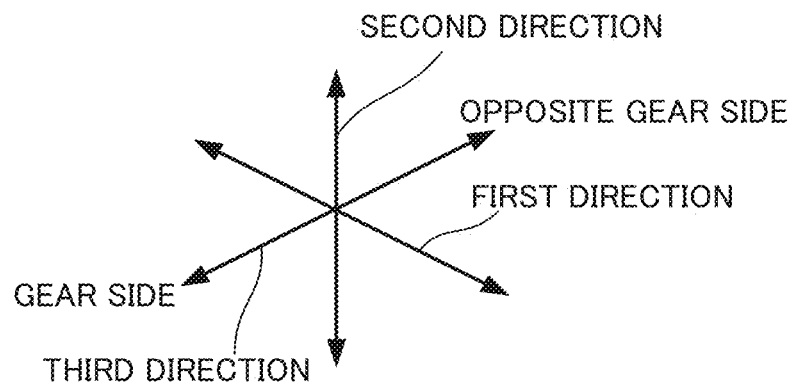
Figure 8:
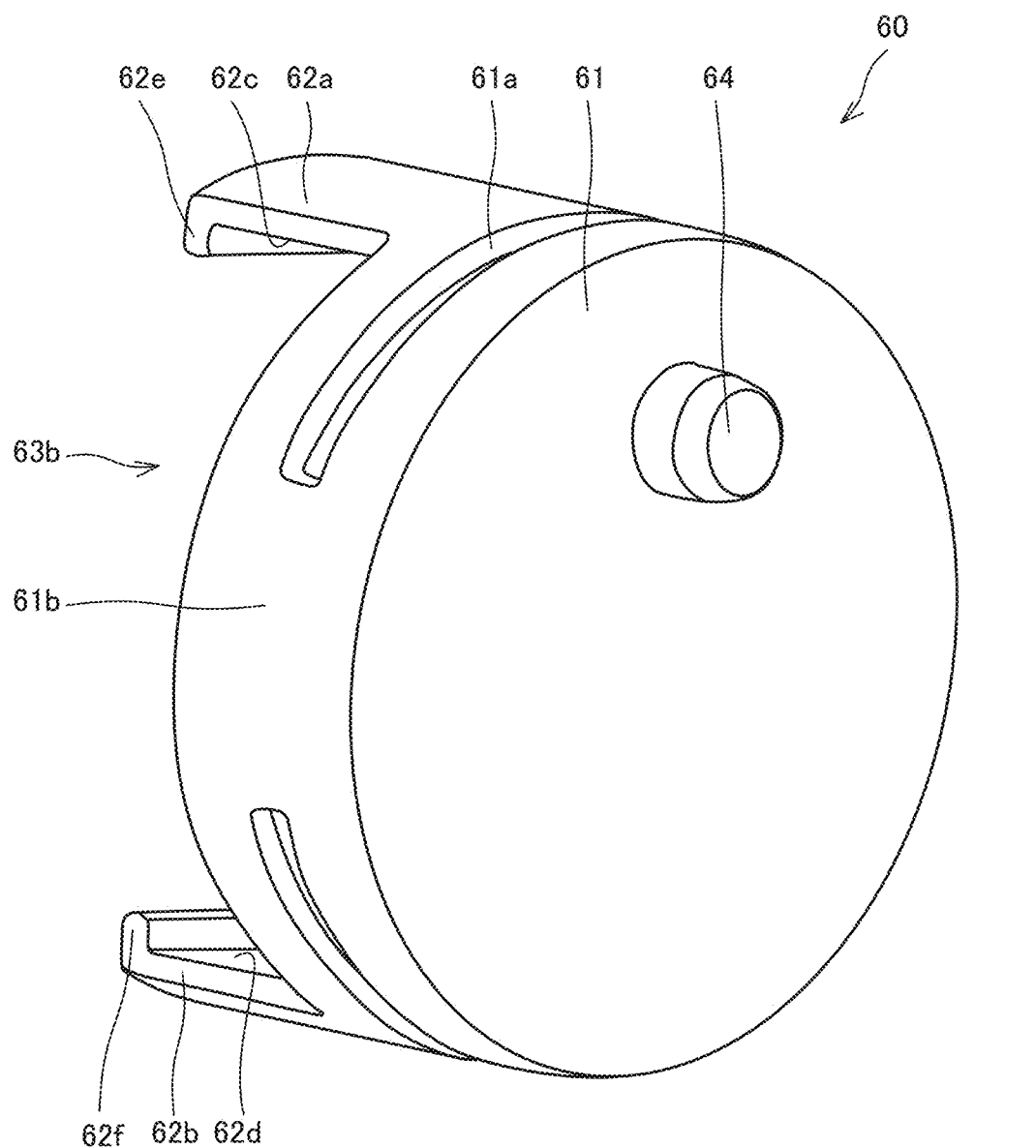
FIG. 8 is a back side perspective view of the second holder according to the first embodiment of the present invention.
Figure 8:
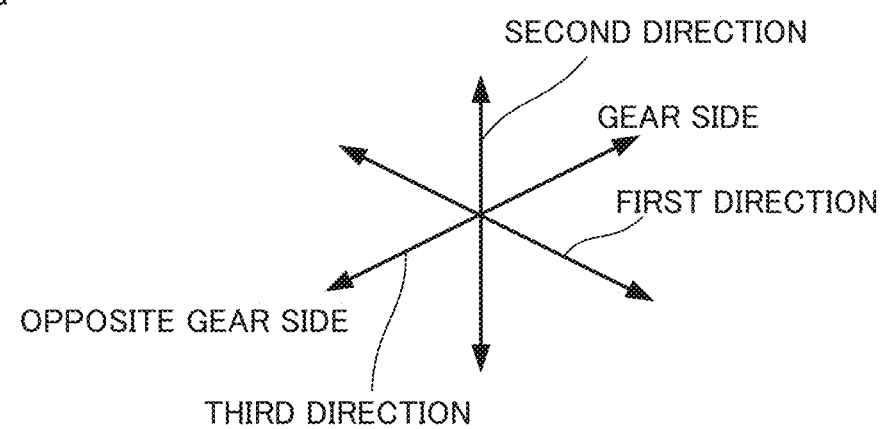

As shown in FIGS. 7 and 8, the second holder 60 includes a disk-like second holder body part 61, a guide part 62 provided on the second holder body part 61, a holder opening part 63 for allowing the holding part 42 of the first holder 40 and the second bearing 11 to pass through thereof, and a positioning protrusion 64 to be inserted into a positioning hole 3e (see FIG. 2) provided in the bottom wall 3c of the housing hole 3d of the gear case 3.

The second holder body part 61 includes a receiving part 65 for housing supporting part 50 of the first holder 40 and an arcuate groove part 61a extending in the circumferential direction and formed in an outer peripheral surface.

The receiving part 65 is a recess having an outer peripheral opening part 65a open in the outer peripheral surface of the second holder body part 61 on the gear side in the third direction. Further, the receiving part 65 is open in one end surface of the second holder body part 61. The supporting part 50 of the first holder 40 is inserted into the receiving part 65 through the outer peripheral opening part 65a. The receiving part 65 supports the spring 70 between the supporting part 50 of the first holder 40 and the receiving part 65 (see FIG. 10).

As shown in FIG. 8, the groove part 61a is a C-shaped arcuate groove having both ends separated in the circumferential direction by a separation wall part 61b. Further, as shown in FIG. 7, the groove part 61a communicates with the outer peripheral opening part 65a of the receiving part 65. In other words, the groove part 61a is divided into two by the outer peripheral opening part 65a. The separation wall part 61b is provided on a side opposite to the outer peripheral opening part 65a in the third direction across the center axis of the second bearing 11.

Figure 9:
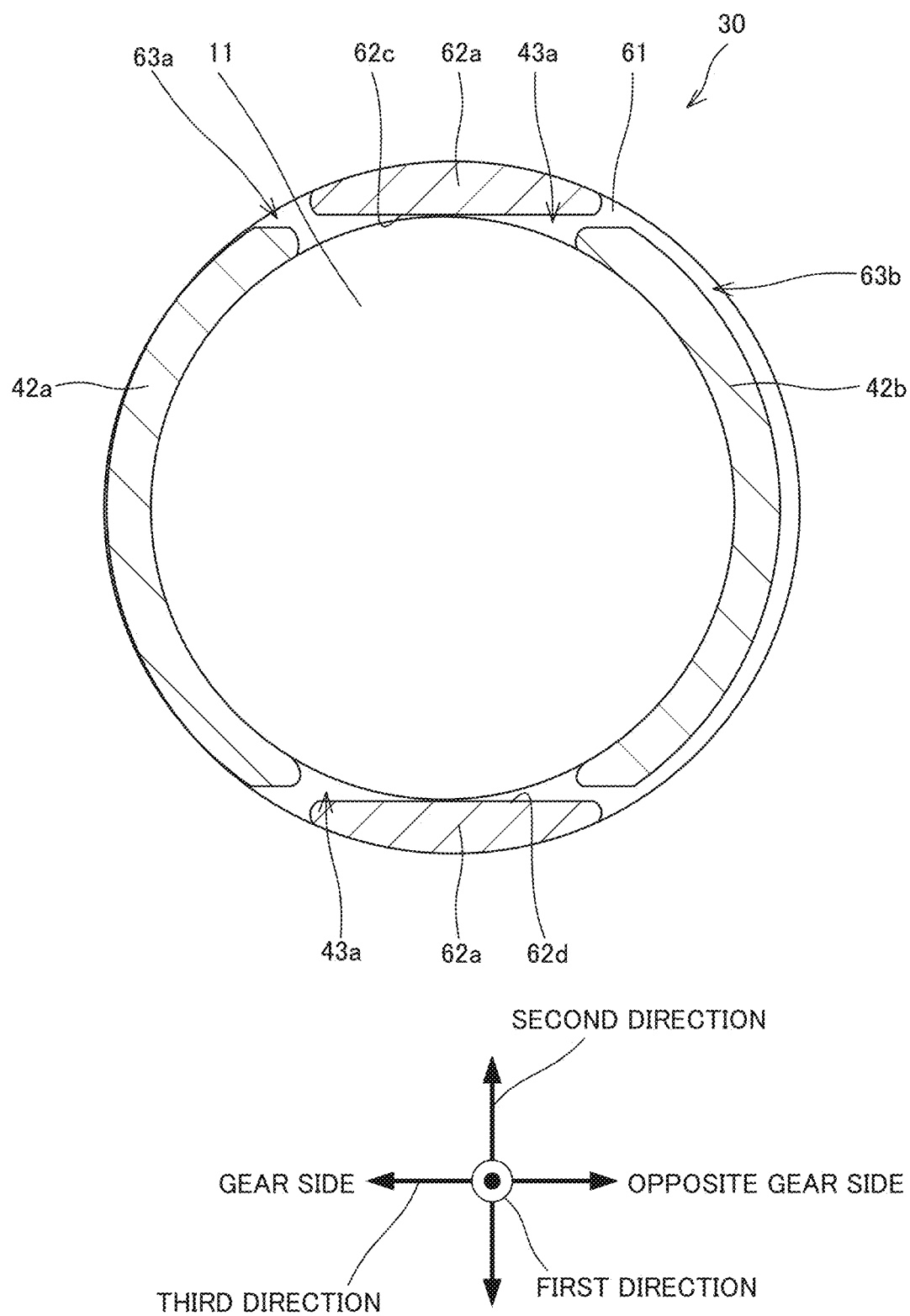
FIG. 9 is a sectional view along line IX-IX in FIG. 3.

As shown in FIGS. 7 to 9, the guide part 62 is composed of a first guide part 62a and a second guide part 62b facing each other across the second bearing 11. The first and second guide parts 62a, 62b are formed to project in the same direction from the second holder body part 61 along the center axis of the second bearing 11 (see FIGS. 7 and 8). It should be noted that the second bearing 11 is shown in a simplified manner in FIG. 9.

The first and second guide parts 62a, 62b are formed with a pair of guide surfaces 62c, 62d, which are flat surfaces extending in the third direction and parallel to each other. A distance between the pair of guide surfaces 62c, 62d is slightly larger than an outer diameter of the outer ring 11a of the second bearing 11. A movement of the second bearing 11 toward the worm wheel 1 along the third direction is guided by the pair of guide surfaces 62c, 62d with the outer peripheral surface of the outer ring 11a held in contact with the pair of guide surfaces 62c, 62d.

Projecting lengths (lengths in the first direction) of the first and second guide parts 62a, 62b from the second holder body part 61 are larger than a thickness (axial length) of the second bearing 11. Further, as shown in FIG. 7, claw parts 62e, 62f extending toward the center axis of the second bearing 11 are formed on the tips of the first and second guide parts 62a, 62b. The detachment of the second bearing 11 held by the first holder 40 from the first holder 40 in the axial direction (first direction) is prevented by the claw parts 62e, 62f (see FIG. 3).

As shown in FIG. 7, the holder opening part 63 is composed of a first holder opening part 63a and a second holder opening part 63b defined by the first and second guide parts 62a, 62b in the circumferential direction of the second bearing 11. That is, in the second holder 60, the first and second holder opening parts 63a, 63b are formed by cutting between the first and second guide parts 62a, 62b in the circumferential direction. The first holder opening part 63a is provided relatively on the gear side in the third direction, and the second holder opening part 63b is provided relatively on the opposite gear side in the third direction. The first and second holder opening parts 63a, 63b respectively allow the passage of the first and second holding parts 42a, 42b of the first holder 40 and the second bearing 11 held by the first holder 40.

Figure 3:
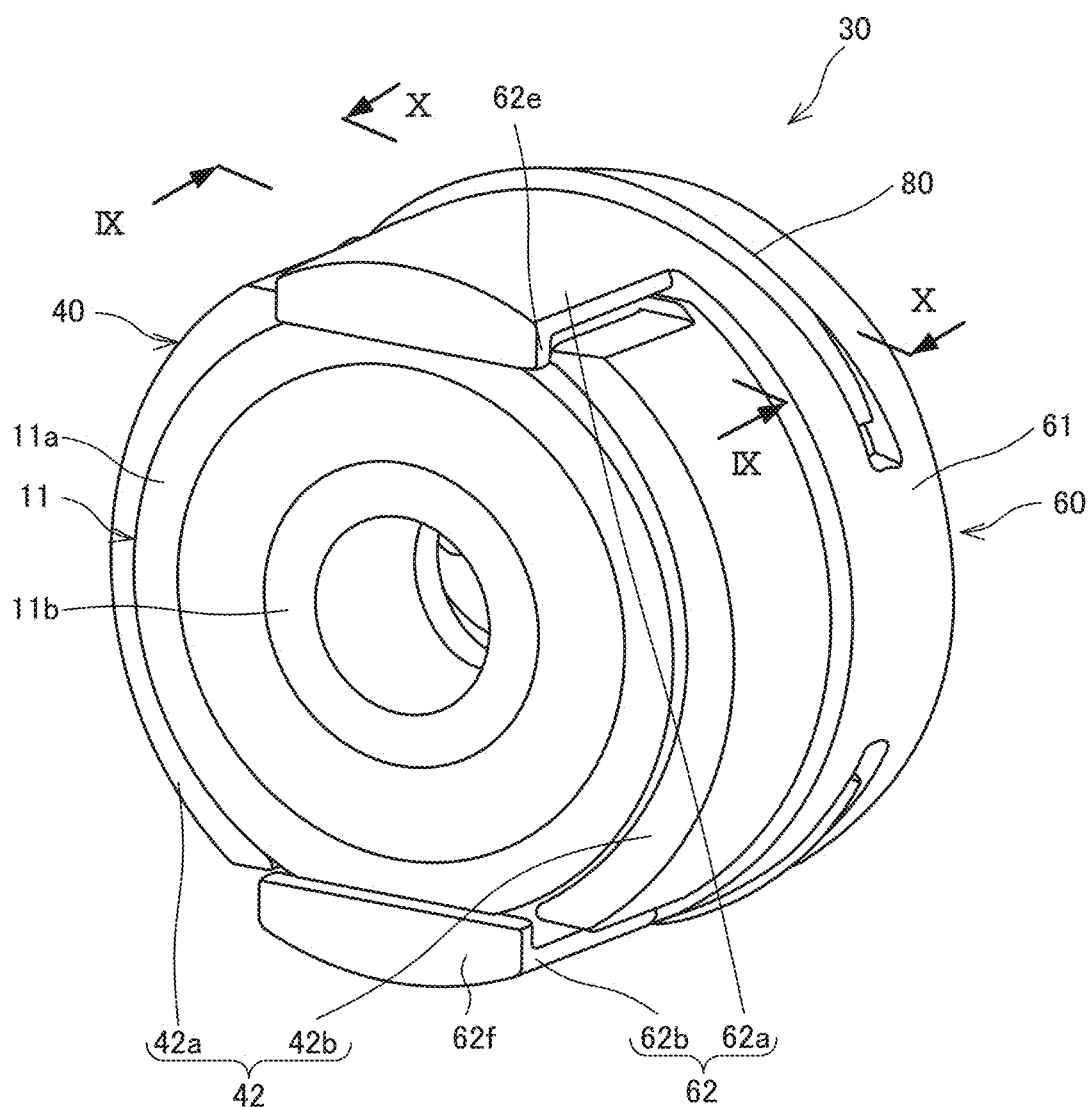
FIG. 3 is a perspective view of a holder according to the first embodiment of the present invention.

As shown in FIGS. 3 and 9, with the first and second holders 40, 60 assembled, the first and second holding parts 42a, 42b of the first holder 40 are adjacent to the first and second guide parts 62a, 62b in the circumferential direction of the second bearing 11 through the first and second holder opening parts 63a, 63b (see FIGS. 7 and 8) of the second holder 60. In other words, the first and second guide parts 62a, 62b of the second holder 60 are adjacent to the first and second holding parts 42a, 42b in the circumferential direction of the second bearing 11 through the first and second opening parts 43a, 43b (see FIG. 4) of the first holder 40.

Further, the first and second holding parts 42a, 42b and the first and second guide parts 62a, 62b are respectively opposed to the inner peripheral surface of the housing hole 3d of the gear case 3. In this way, the first and second holders 40, 60 are provided not to overlap each other in a radial direction between the second bearing 11 and the housing hole 3d. Thus, the holder 30 can have a compact configuration in the radial direction of the second bearing 11.

As shown in FIG. 8, the positioning protrusion 64 is provided continuously with the second holder body part 61 on a side opposite to the guide part 62 in the axial direction. The positioning protrusion 64 is provided at a position separated in the radial direction from the center axis of the second bearing 11. The positioning protrusion 64 is fitted into the positioning hole 3e (see FIG. 2) formed in the bottom wall 3c of the housing hole 3d with a clearance defined therebetween. In this way, the holder 30 is positioned in the gear case 3 and the rotation of the holder 30 in the housing hole 3d is restricted.

Figure 10:
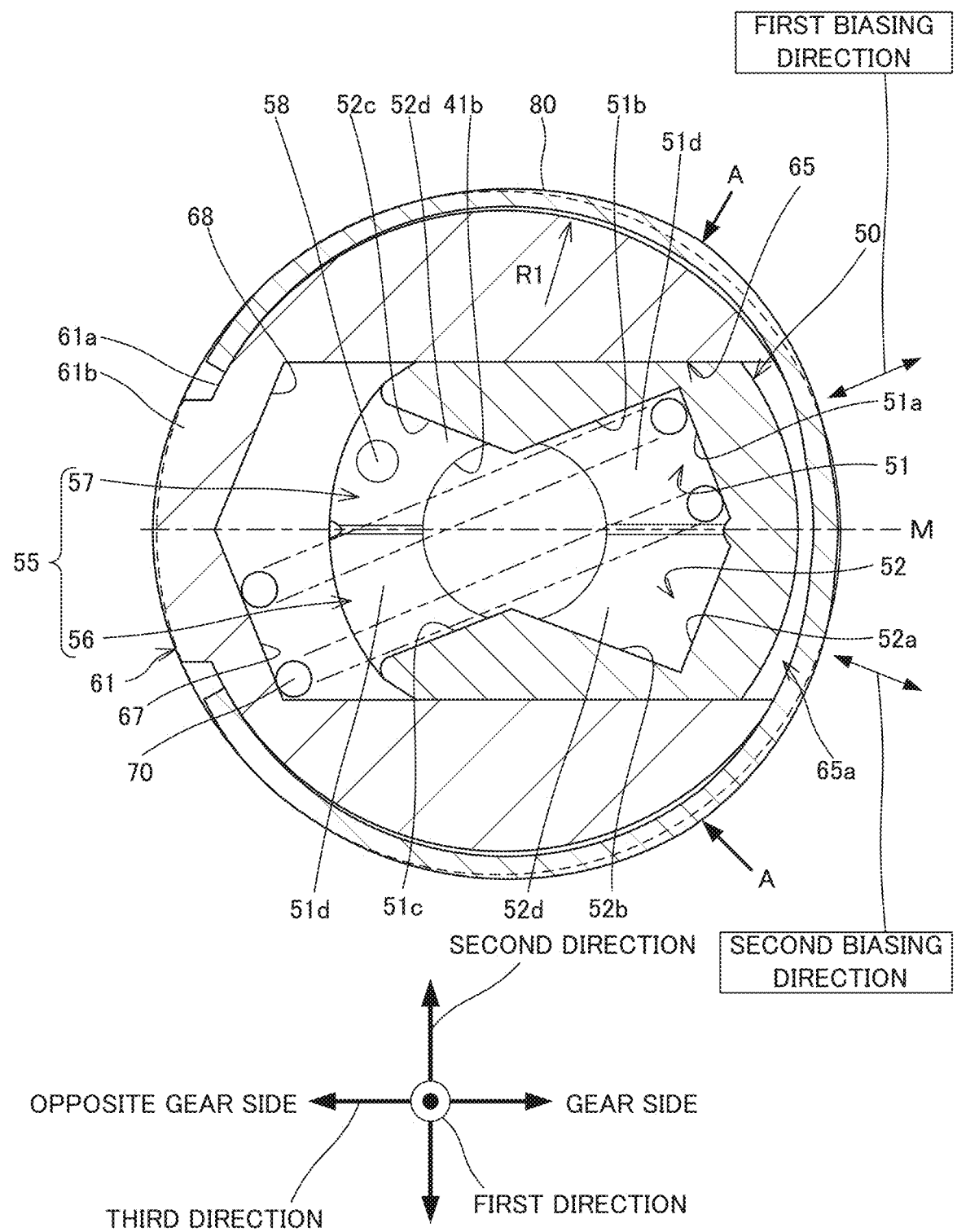
FIG. 10 is a sectional view along line X-X in FIG. 3.

As shown in FIG. 10, the spring 70 is held in a compressed state between the supporting part 50 of the first holder 40 and the receiving part 65 of the second holder 60. The spring 70 exerts such a biasing force as to separate the first and second holders 40, 60 from each other along the third direction. In this way, the spring 70 biases the second bearing 11 in a direction to reduce a clearance between the tooth part 2a of the worm shaft 2 and the tooth part of the worm wheel 1. That is, the spring 70 biases the worm shaft 2 toward the worm wheel 1 via the second bearing 11. A supporting structure for the spring 70 is described in detail later.

Figure 11:
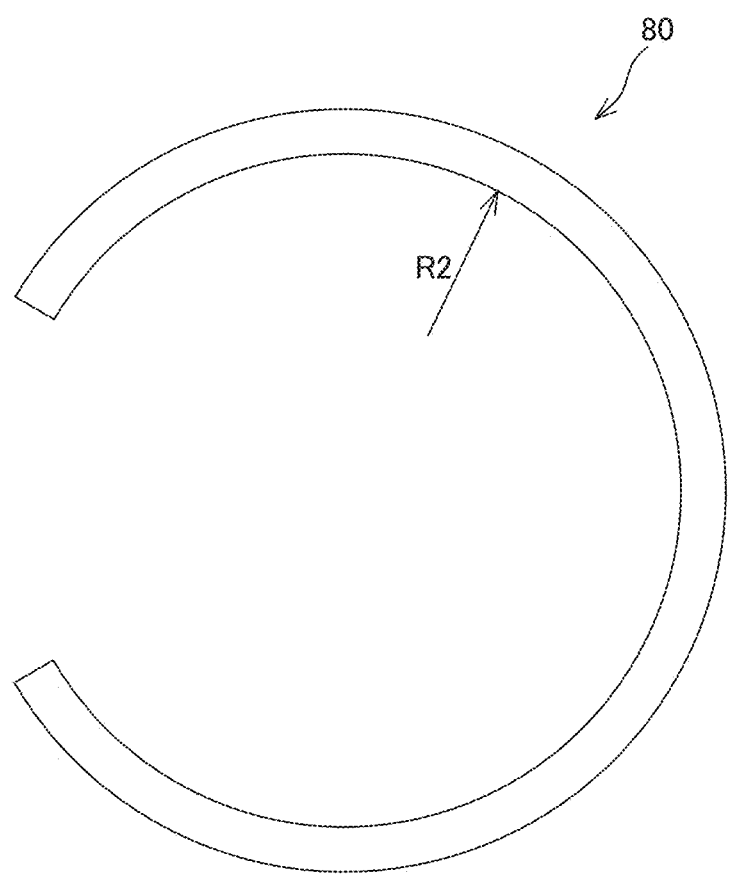
FIG. 11 is a plan view of a clip according to the first embodiment of the present invention.

As shown in FIGS. 10 and 11, the clip 80 is a C-shaped member made of metal and having a circular cross-section. The clip 80 is mounted into the groove part 61a over the outer peripheral opening part 65a of the receiving part 65. In this way, the detachment of the second bearing 11 and the first holder 40 from the second holder 60 through the outer peripheral opening part 65a of the receiving part 65 and the first holder opening part 63a caused by the biasing force of the spring 70 is restricted. In this manner, the first and second holders 40, 60 are locked by the clip 80.

It should be noted that, in this specification, the locking of the first and second holders 40, 60 indicates a state where the escape (separation) of the first holder 40 from the inside of the second holder 60 caused by the biasing force of the spring 70 is restricted in a state where the holder 30 is not mounted in the housing hole 3d of the gear case 3.

A width of the supporting part 50 of the first holder 40 in the third direction is smaller than a width of the receiving part 65 of the second holder 60 in the third direction as shown in FIG. 10. Thus, the supporting part 50 is movable in the third direction between the clip 80 and the receiving part 65 with the first and second holders 40, 60 locked by the clip 80. That is, in the state where the holder 30 is not mounted in the housing hole 3d, the first holder 40 is movable in the third direction between a state where the supporting part 50 is in contact with the clip 80 and a state where the supporting part 50 is in contact with the inner peripheral surface of the receiving part 65 of the second holder 60. The locking structure for the first and second holders 40, 60 by the clip 80 is described in detail later.

With the first and second holders 40, 60 assembled, the parts of the outer peripheral surface of the second bearing 11 exposed through the first and second opening parts 43a, 43b are in contact with the guide surfaces 62c, 62d of the first and second guide parts 62a, 62b as shown in FIG. 9. The spring 70 is provided between the first and second holders 40, 60 and biases to separate the first and second holders 40, 60 from each other. Thus, the second bearing 11 is guided to linearly move by the pair of guide surfaces 62c, 62d parallel to each other. As just described, in the present embodiment, the second bearing 11 made of metal and the second holder 60 made of resin are in contact with a hardness difference.

Since the second bearing 11 is directly in contact with the guide part 62 in the holder 30 as described above, it can be suppressed that the dimensional accuracy of the first holder 40 affects the meshing accuracy of the worm wheel 1 and the worm shaft 2.

Next, the supporting structure for the spring 70 by the first and second holders 40, 60 is described in detail.

As shown in FIGS. 5 and 10, the supporting part 50 includes a first supporting part 51 capable of supporting the spring 70 to exert a biasing force in a first biasing direction and a second supporting part 52 capable of supporting the spring 70 to exert a biasing force in a second biasing direction. The first biasing direction is a direction inclined with respect to the third direction in which the second bearing 11 is guided by the guide part 62. The second biasing direction is a direction inclined with respect to the third direction and different from the first biasing direction.

The spring housing recess part 55 is open on the opposite gear side in the third direction and open in an end surface 50a of the supporting part 50 perpendicular to the first direction. The center hole 41b of the first holder body part 41 is open to the spring housing recess part 55.

The spring housing recess part 55 includes a first housing recess part 56 capable of housing the spring 70 to exert a biasing force in the first biasing direction and a second housing recess part 57 capable of housing the spring 70 to exert a biasing force in the second biasing direction. The first housing recess part 56 is defined by the first supporting part 51. The second housing recess part 57 is defined by the second supporting part 52.

As shown in FIG. 10, the first supporting part 51 (first housing recess part 56) and the second supporting part 52 (second housing recess part 57) are mirror-symmetrically provided with respect to a reference plane M parallel to the third direction. The first and second housing recess parts 56, 57 are provided to intersect and communicate with each other. The first and second housing recess parts 56, 57 intersect each other at a position facing the center hole 41b.

The first supporting part 51 has a first seating surface 51a perpendicular to the first biasing direction, first side wall surfaces 51b, 51c in the form of flat surfaces extending in the first biasing direction and a first peripheral wall surface 51d formed to have an arcuate cross-section perpendicular to the first biasing direction. One first side wall surface 51b is formed from the first seating surface 51a and faces the spring 70 housed in the first housing recess part 56. The other first side wall surface 51c is separated from the first seating surface 51a by the second housing recess part 57 defined by the second supporting part 52. The first peripheral wall surface 51d is connected to each of the first seating surface 51a and the first side wall surfaces 51b, 51c. The spring 70 housed in the first housing recess part 56 is restricted from moving obliquely to the first biasing direction by the first supporting part 51.

The second supporting part 52 includes a second seating surface 52a perpendicular to the second biasing direction, second side wall surfaces 52b, 52c in the form of flat surfaces extending in the second biasing direction and a second peripheral wall surface 52d formed to have an arcuate cross-section perpendicular to the second biasing direction. One second side wall surface 52b is formed from the second seating surface 52a and faces the spring 70 housed in the second housing recess part 57. The other second side wall surface 52c is separated from the second seating surface 52a by the first housing recess part 56 defined by the first supporting part 51. The second peripheral wall surface 52d is connected to each of the second seating surface 52a and the second side wall surfaces 52b, 52c. The spring 70 housed in the second housing recess part 57 is restricted from moving obliquely to the second biasing direction by the second supporting part 52.

As shown in FIG. 10, the receiving part 65 of the second holder 60 has a first receiving surface 67 perpendicular to the first biasing direction and a second receiving surface 68 perpendicular to the second biasing direction. The spring 70 supported by the first supporting part 51 is seated on the first receiving surface 67. The spring 70 supported by the second supporting part 52 is seated on the second receiving surface 68. It should be noted that the shape of the receiving part 65 is not limited to this and may be such that the spring 70 supported by the first supporting part 51 and the spring 70 supported by the second supporting part 52 can be respectively seated. For example, the first and second receiving surfaces 67, 68 may be formed into arcuate surfaces continuous with each other.

An opening of the spring housing recess part 55 in the end surface 50a of the supporting part 50 is closed by a side surface 65b (see FIG. 7) of the receiving part 65. In this way, the spring 70 supported by the first or second supporting part 51, 52 is surrounded from four sides around a center axis thereof by the first side wall surfaces 51b, 51c or second side wall surfaces 52b, 52c, the first or second peripheral wall surface 51d or 52d and the side surface 65b of the receiving part 65. Thus, the spring 70 is stably supported.

Further, the supporting part 50 is provided with a projection 58 serving as an erroneous assembly preventing part for preventing the spring 70 from being erroneously assembled in a wrong biasing direction. Since the spring 70 is supported by the first supporting part 51 in the present embodiment, the projection 58 is provided to project in the first direction from the second peripheral wall part 52d of the second supporting part 52 as shown in FIG. 10. If the spring 70 that should be originally held by the first supporting part 51 is held by the second supporting part 52, the spring 70 is lifted from the second peripheral wall surface 52d by the projection 58 and a part of the spring 70 projects from the end surface 50a of the supporting part 50. If this state is reached, the supporting part 50 cannot be inserted into the receiving part 65 together with the spring 70 and the first and second holders 40, 60 cannot be assembled. Thus, erroneous assembly can be detected. As just described, if the spring 70 is supported by the second supporting part 52 originally not supposed to support the spring 70, the assembling of the first and second holders 40, 60 is obstructed by the projection 58 and erroneous assembly can be prevented.

It should be noted that, if the spring 70 is supported by the second supporting part 52, the projection 58 is provided on the first peripheral wall surface 51d of the first supporting part 51. Further, the projection 58 may be provided on the first or second seating surface 51a, 52a or the first or second side wall surface 51b, 51c, 52b, 52c without limitation to the first or second peripheral wall surface 51d or 52d. To more reliably prevent erroneous assembly by increasing a lifting amount of the spring 70, the projection 58 is desirably provided at a position maximally distant from the first or second seating surface 51a, 52a, e.g. at a position more distant from the first or second seating surface 51a, 52a than the center hole 41b. Further, the projection 58 may be provided in the receiving part 65 of the second holder 60 without limitation to the first holder 40.

Here, a reaction force from the worm wheel 1 to the worm shaft 2 acts in a different direction according to a rotating direction of the worm shaft 2. Thus, the spring 70 is desirably arranged to bias the worm shaft 2 obliquely with respect to an inter-axis direction (third direction) of the worm wheel 1 and the worm shaft 2 to give a proper biasing force to the meshed part of the worm shaft 2 and the worm wheel 1 while resisting the reaction force from the worm wheel 1.

On the other hand, the configuration of the power steering device 100 differs depending on whether the power steering device 100 is installed in a right-hand steering vehicle or in a left-hand steering vehicle. Specifically, since an angle of inclination of the output shaft 22 with respect to the rack shaft 8 is reversed with respect to a center of the vehicle, a twist direction of the worm wheel 1 is opposite in each case. Thus, directions of the proper biasing forces given to the meshed part by the spring 70 in the right-hand steering vehicle and the left-hand steering vehicle are also different from each other.

In contrast, the spring 70 is selectively supported by the first or second supporting part 51, 52 in the present embodiment. The first and second supporting parts 51, 52 can support the spring 70 so that biasing forces can be exerted in two directions including the first and second biasing directions. Thus, by setting the first biasing direction as a direction in which a proper biasing force is exerted to the meshed part in the right-hand steering vehicle and the second biasing direction as a direction in which a proper biasing force is exerted to the meshed part in the left-hand steering vehicle, the common holder 30 can be used regardless of whether the power steering device 100 is installed in the right-hand steering vehicle or in the left-hand steering vehicle.

Since the common holder 30 can be used, a mold and the like for manufacturing the holder 30 can also be used in common and manufacturing cost can be reduced. It should be noted that, even if the projection 58 is provided as the erroneous assembly preventing part as described above, the mold itself can be commonly used since it is sufficient to insert a die for forming the projection 58 into the mold. Thus, manufacturing cost can be reduced even if the projection 58 serving as the erroneous assembly preventing part is formed.

Further, the first and second housing recess parts 56, 57 intersect at the position facing the center hole 41b. Thus, the spring 70 is supported to face the center hole 41b regardless of whether the spring 70 is supported by the first supporting part 51 or supported by the second supporting part 52. Therefore, even after the first holder 40, the second holder 60 and the second bearing 11 are assembled and integrated, an inclined (biasing) direction of the spring 70 can be visually confirmed through a hole of the inner ring 11b of the second bearing 11 and the center hole 41b. In this way, by which of the first and second supporting parts 51, 52 the spring 70 is supported can be easily confirmed even after the holder 30 is assembled. By confirming the biasing direction of the spring 70 in this way, whether or not a combination of the steering wheel position of the vehicle and the biasing direction of the spring 70 is proper can be easily confirmed and erroneous assembly can be prevented.

Next, the locking structure for the first and second holders 40, 60 is described in detail.

As shown in FIG. 11, the clip 80 is formed by bending a wire having a uniform circular cross-section into a C shape. A wire diameter (thickness) of the clip 80 is uniform in the circumferential direction.

A depth (length along a radial direction of the center axis of the second holder 60) of the groove part 61a of the second holder 60 is slightly larger than the wire diameter of the clip 80 and uniform in the circumferential direction. A radius of curvature R1 (see FIG. 10) of a bottom part (part defining the depth) of the groove part 61a is larger than a radius of curvature R2 (see FIG. 11) of the inner periphery of the clip 80 in a natural state. In this way, the clip 80 contacts the bottom part of the groove part 61a on both end parts and is elastically deformed with the both end parts serving as supporting points as shown in FIG. 10 when the clip 80 is mounted into the groove part 61a while being expanded. The clip 80 bulges most at the positions of both circumferential sides of the outer peripheral opening part 65a of the receiving part 65 (parts A in FIG. 10) and partially projects radially outward from the outer peripheral surface of the second holder body part 61. Thus, an outer diameter of the entire holder 30, specifically a maximum width between the second holder body part 61 and the outer periphery of the clip 80, becomes larger than an inner diameter of the housing hole 3d.

Figure 12:
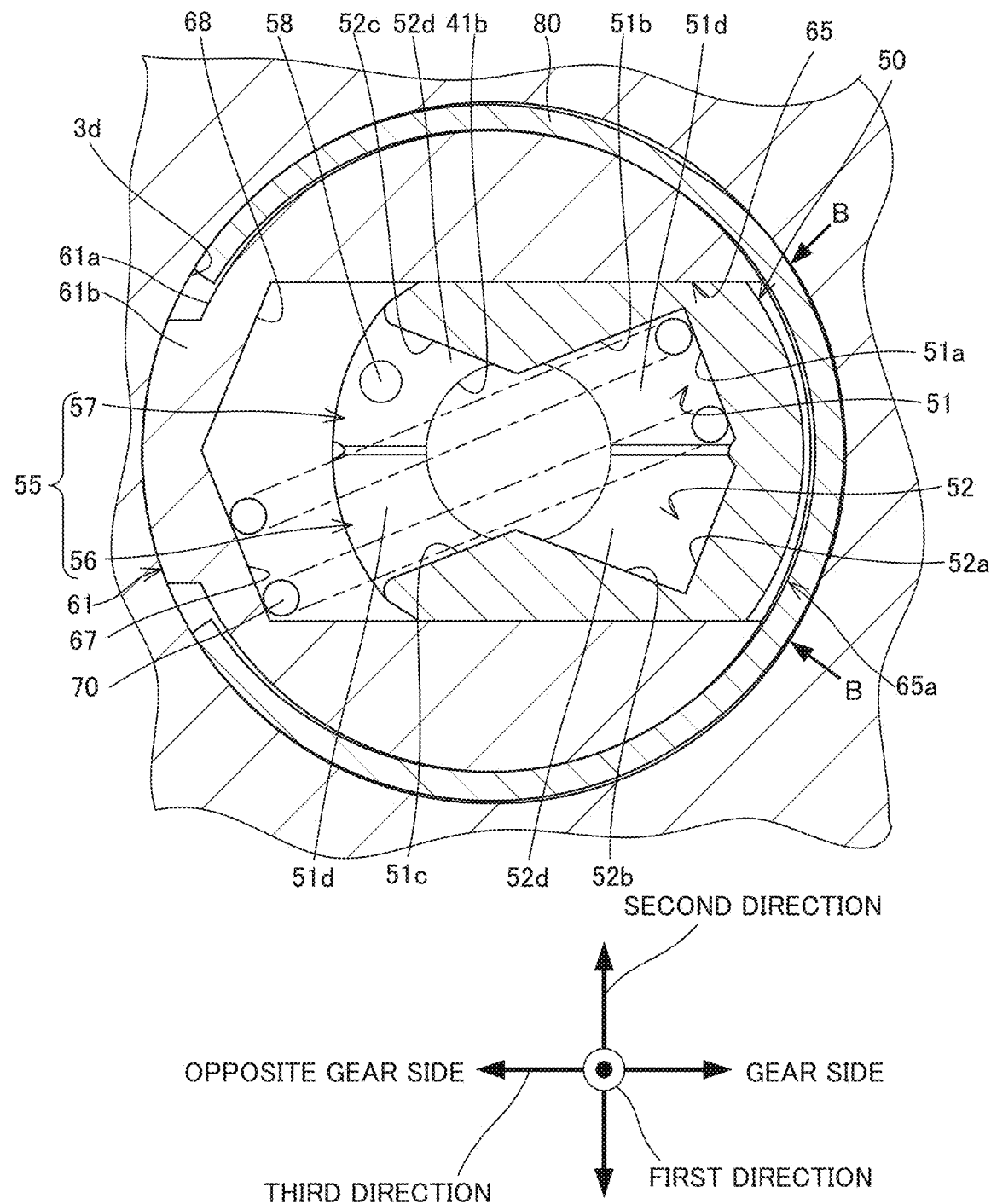
FIG. 12 is a sectional view showing a state where the holder according to the first embodiment of the present invention is incorporated in a gear case.

In assembling the holder 30 into the housing hole 3d of the gear case 3, a part of the clip 80 bulging radially outward from the outer peripheral surface of the second holder body part 61 is pressed radially inwardly. Thus, as shown in FIG. 12, the radially inwardly pressed clip 80 contacts and presses the second holder body part 61 (parts B in FIG. 12). In this way, the second holder 60 receives an elastic force from the most bulging parts of the clip 80 and is biased in the third direction toward the opposite gear side to be separated from the worm wheel 1. In this manner, the holder 30 is elastically supported in the housing hole 3d by the elastic force of the clip 80.

Further, the second holder body part 61 of the second holder 60 is pressed against the inner peripheral surface of the housing hole 3d by receiving the elastic force (biasing force) of the clip 80. More specifically, the separation wall part 61b and a part of the outer periphery extending in the axial direction from the separation wall part 61b in the second holder body part 61 are pressed against the inner peripheral surface of the housing hole 3d.

Here, if a reaction force acts from the worm wheel 1 to the worm shaft 2 when the second holder 60 is not in contact with the inner peripheral surface of the housing hole 3d on the opposite gear side, the first holder 40 moves toward the opposite gear side against the biasing force of the spring 70 and the second holder 60 also moves toward the opposite gear side against the elastic force of the clip 80. Since both the first and second holders 40, 60 supporting the spring 70 move in this way, the biasing force exerted by the spring 70 varies and is not stabilized.

In contrast, in the present embodiment, the second holder 60 is in contact with the inner peripheral surface of the housing hole 3d in a stationary state where no reaction force acts from the worm wheel 1 to the worm shaft 2. Thus, even if a reaction force acts from the worm wheel 1, any further movement of the second holder 60 in a separating direction from the worm wheel 1 is restricted. By restricting the movement of the second holder 60 supporting one end of the spring 70, the one end of the spring 70 is grounded. Thus, a stable biasing force can be exerted against the reaction force of the worm wheel 1. Therefore, backlash can be more reliably reduced.

It should be noted that the clip 80 and the groove part 61a of the second holder 60 are so configured that an elastic force (biasing force) for pressing the second holder 60 toward the opposite gear side against the inner peripheral surface of the housing hole 3d is larger than a friction force generated when the second holder 60 moves toward the inner peripheral surface of the housing hole 3d. Specifically, the clip 80 and the groove part 61a are so configured that a biasing force of the clip 80 for biasing the second holder 60 is larger than the sum of a friction force generated between the second holder 60 and the first holder 40 and a friction force generated between the first and second guide parts 62a, 62b of the second holder 60 and the second bearing 11. Further, the clip 80 and the groove part 61a are so configured that the clip 80 exerts a biasing force against the second holder 60 to overcome a friction force generated in the second holder 60 against the first holder 40 and the second bearing 11. In this way, the second holder 60 can be more reliably pressed toward the opposite gear side against the inner peripheral surface of the housing hole 3d by the clip 80.

Further, as described above, the first and second holders 40, 60 are configured not to overlap in the radial direction of the second bearing 11, and the spring 70 is provided between the first and second holders 40, 60 and separated from the second bearing 11 in the axial direction. In this way, the holder 30 can have a compact configuration. On the other hand, by employing this configuration, the first holder 40 receives the biasing force of the spring 70 to escape from the second holder 60. In contrast, in the present embodiment, the first and second holders 40, 60 are locked by the clip 80 so that the first holder 40 is not separated by receiving the biasing force of the spring 70. By integrating the first holder 40, the second holder 60 and the second bearing 11 by the clip 80, these can be integrally assembled into the housing hole 3d of the gear case 3 and assemblability is improved. Therefore, the holder 30 has a compact configuration and assemblability into the housing hole 3d is also improved.

Furthermore, since the holder 30 is elastically supported by the clip 80 for integrating the holder 30, a force for holding the holder 30 in the housing hole 3d can be secured without increasing the number of components. Further, since the second holder 60 is pressed against the inner peripheral surface of the housing hole 3d by the elastic force of the clip 80, the biasing force of the spring 70 can be stabilized.

As described above, in the present embodiment, the first and second holders 40, 60 are configured not to overlap on a radially outer side of the second bearing 11, and the first and second holders 40, 60 are locked and the holder 30 is elastically supported by the clip 80. In this way, effects of making the configuration compact, ensuring the assemblability of the holder 30 into the housing hole 3d, ensuring the holding force for the holder 30 and stabilizing the biasing force of the spring 70 can be integrally achieved without increasing the number of components.

Further, the groove part 61a is formed into such a C shape corresponding to the shape of the clip 80 by having the both ends separated by the separation wall part 61b. Thus, a movement of the clip 80 housed in the groove part 61a in the circumferential direction is restricted by the contact of the both ends thereof with the separation wall part 61b located at the end parts of the groove part 61a. That is, since relative rotation of the clip 80 and the second holder 60 is restricted by the separation wall part 61b, the clip 80 is mounted to constantly face the outer peripheral opening part 65a of the receiving part 65. In this way, the detachment of the second holder 40 and the second bearing 11 through the outer peripheral opening part 65a of the receiving part 65 is more reliably prevented.

It should be noted that, without limitation to this, the second holder 60 may not be provided with the separation wall part 61b and the groove part 61a may be an annular groove. In this case, a clearance in the circumferential direction between the both end parts of the clip 80 is desirably smaller than a width of the outer peripheral opening part 65a (outer diameter of the second bearing 11). According to this, even if the clearance of the clip 80 and the outer peripheral opening part 65a overlap, the detachment of the second bearing 11 and the first holder 40 through this clearance is suppressed. It should be noted that, if there is no possibility that the clearance of the clip 80 and the outer peripheral opening part 65a overlap and the second bearing 11 and the first holder 40 are detached, the groove part 61a may be annularly formed and the clearance of the clip 80 may be larger than the width of the outer peripheral opening part 65a (outer diameter of the second bearing 11).

Next, the assembling of the holder 30 and the power steering device 100 is described.

Figure 13:
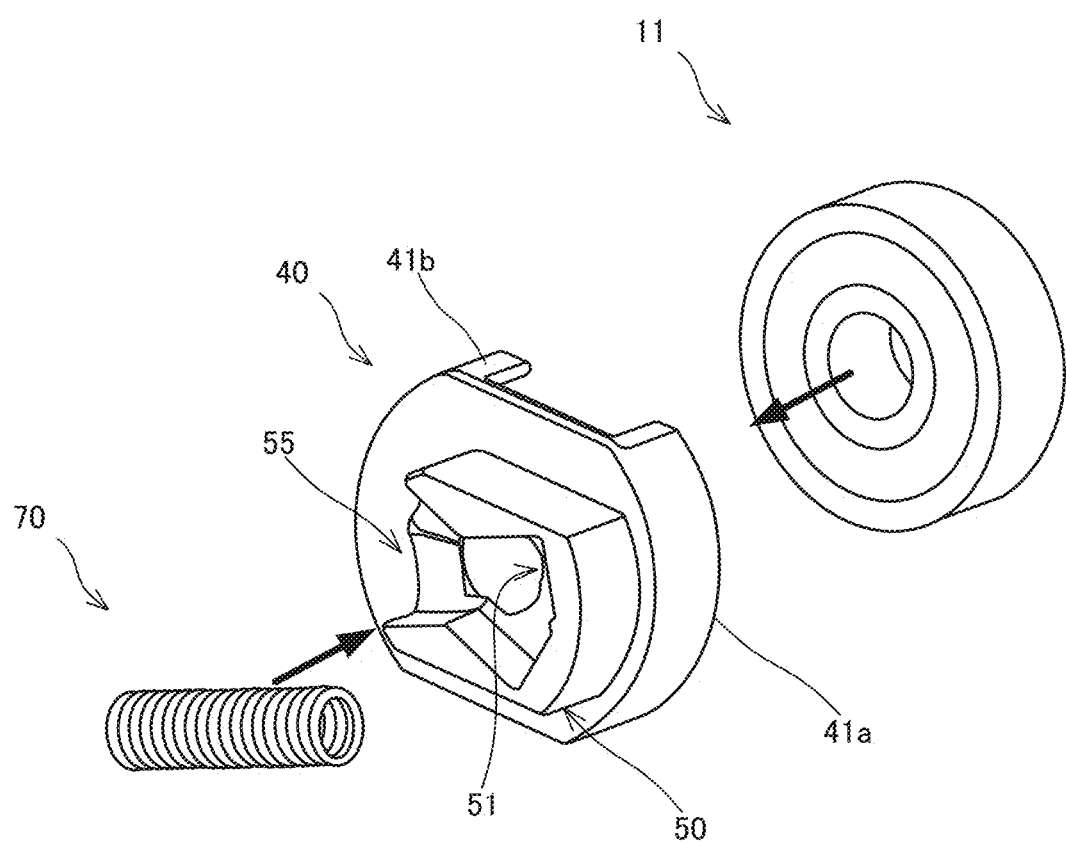
FIG. 13 is a perspective view showing an assembling procedure of the holder according to the first embodiment of the present invention, i.e. an assembling process of the first holder, the bearing and a spring.

In assembling the holder 30 and the second bearing 11, the second bearing 11 is first housed inside the first and second holding parts 42a, 42b of the first holder 40 and held by the first and second holding parts 42a, 42b as shown in FIG. 13. In this state, parts of the outer peripheral surface of the second bearing 11 are exposed by the first and second opening parts 43a, 43b. Further, the spring 70 is housed into the spring housing recess part 55 in the support part 50 of the first holder 40 and supported by the first support part 51.

Figure 14:
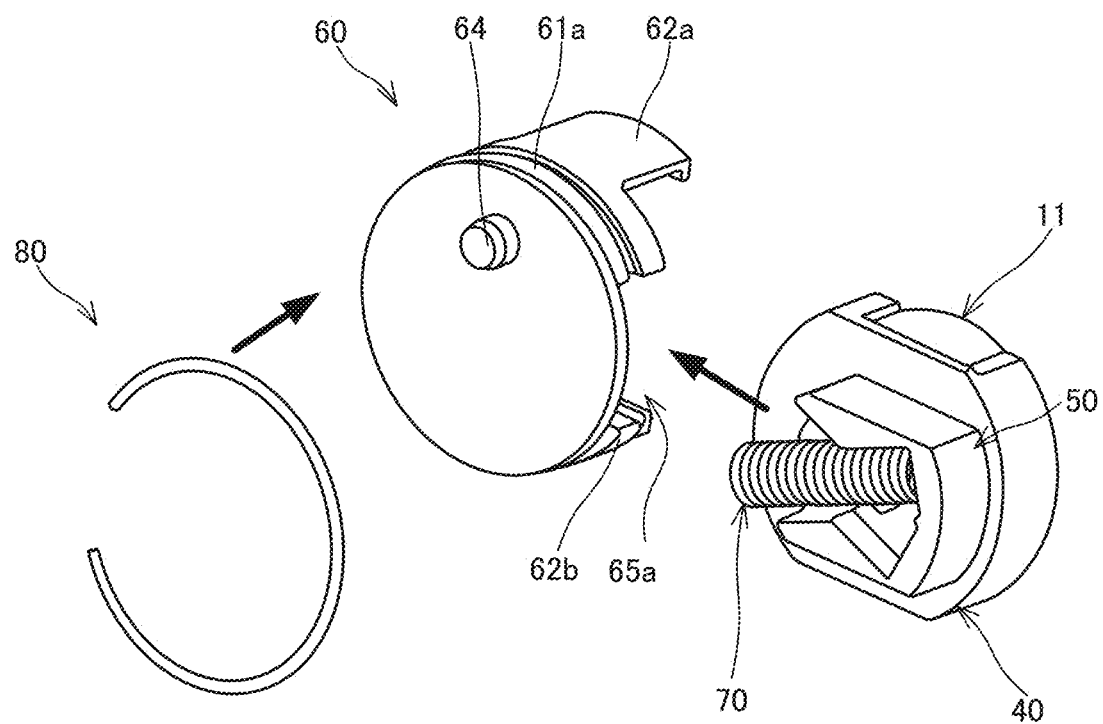
FIG. 14 is a perspective view showing an assembling procedure of the holder according to the first embodiment of the present invention, i.e. an assembling process of the second holder and the clip.

Subsequently, the first holder 40 and the second bearing 11 are so assembled with the second holder 60 that the parts of the outer peripheral surface of the second bearing 11 exposed from the first and second opening parts 43a, 43b are in contact with the guide surfaces 62c, 62d (see FIG. 9, etc.) of the first and second guide parts 62a, 62b. More specifically, as shown in FIG. 14, the support part 50 of the first holder 40 and the spring 70 are inserted into the receiving part 65 of the second holder 60 through the outer peripheral opening part 65a in the radial direction of the second bearing 11. Since the biasing direction of the spring 70 and an inserting direction of the first holder 40 and the second bearing 11 into the second holder 60 substantially coincide in this way, assembling is easily performed.

Subsequently, the clip 80 is wound on the outer periphery of the second holder 60 while being expanded, and is mounted into the groove part 61a. In this way, the first and second holders 40, 60 are prevented from being separated from each other by the clip 80, and locked via the clip 80. Further, as described above, the radius of curvature R2 of the inner periphery of the clip 80 is smaller than the radius of curvature R1 of the bottom part of the groove part 61a. Thus, a part of the clip 80 slightly projects from the outer peripheral surface of the second holder 60 in a state where the holder 30 is not mounted in the gear case 3 (see FIG. 10).

Subsequently, the holder 30 is assembled into the housing hole 3d of the gear case 3. At this time, the part of the clip 80 projecting from the groove part 61a is pressed radially inwardly, and the second holder 60 is biased in the third direction to be separated from the worm wheel 1 by the clip 80. Thus, the holder 30 is elastically supported in the housing hole 3d by the biasing force of the clip 80.

By inserting a tip part of the worm shaft 2 into a hollow part in the center of the second bearing 11 after the holder 30 is assembled into the gear case 3 in this way, the assembling of the power steering device 100 is completed.

In a state inserted in the second bearing 11, the worm shaft 2 receives the biasing force transmitted from the spring 70 toward the worm wheel 1 via the first holder 40 and the second bearing 11. In this way, backlash between the worm shaft 2 and the worm wheel 1 is reduced and the meshing accuracy of the worm shaft 2 and the worm wheel 1 is ensured.

With the worm shaft 2 inserted in the second bearing 11, the first holder 40 is not in contact with and is separated from the inner peripheral surface of the housing hole 3d (see FIG. 2). As the rotation of the worm shaft 2 is repeated and the meshed part of the worm shaft 2 and the worm wheel 1 is worn, the first holder 40 receives the biasing force of the spring 70 and approaches the inner peripheral surface of the housing hole 3d. In this way, even if the meshed part of the worm shaft 2 and the worm wheel 1 is worn, backlash can be reduced. The first holder 40 is movable toward the worm wheel 1 until contacting the inner peripheral surface of the housing hole 3d. In other words, a movement of the first holder 40 toward the gear side in the third direction is restricted by the inner peripheral surface of the housing hole 3d.

Next, modifications of the present embodiment are described. The following modifications are also within the scope of the present invention and it is also possible to combine any of the following modifications with each component of the above embodiment, combine any of the following modifications with another embodiment to be described below or any of modifications thereof or combine the following modifications. Further, any of the modifications described in the description of the above embodiment can be also similarly combined with another modification or another embodiment.

Figure 15:
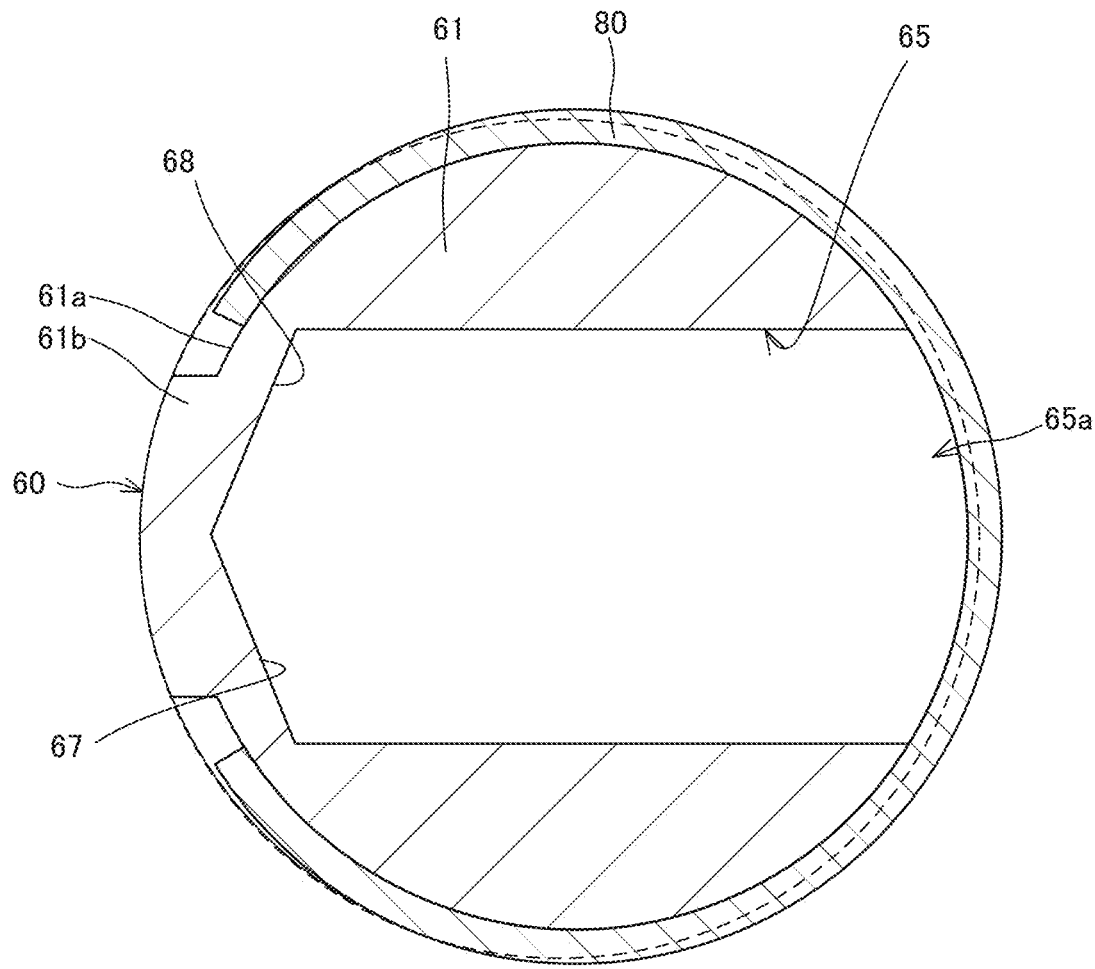
FIG. 15 is a sectional view showing a first modification of the holder according to the first embodiment of the present invention.
Figure 15:
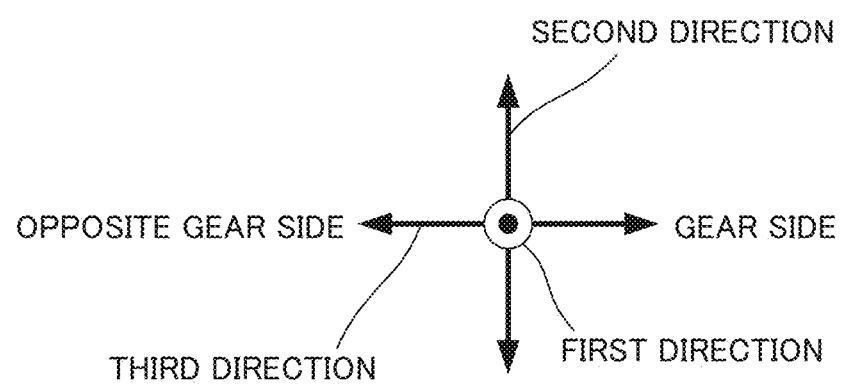

First, a modification of the locking structure for the first and second holders 40, 60 by the clip 80 is described with reference to FIGS. 15 to 17. It should be noted that only the clip 80 and the second holder 60 are shown and the other components are not shown in FIGS. 15 and 16.

In the above embodiment, the clip 80 is formed to have a uniform wire diameter and the groove part 61a is formed to have a uniform depth. The radius of curvature R2 of the inner periphery of the clip 80 is smaller than the radius of curvature R1 of the bottom part of the groove part 61a. Further, the holder 30 is elastically supported in the housing hole 3d by the clip 80. In contrast, the holder 30 may not necessarily be elastically supported in the housing hole 3d.

Further, in the case of elastically supporting the holder 30, the second holder 60 may not necessarily be pressed against the inner peripheral surface of the housing hole 3d by the clip 80. Further, even if the second holder 60 is pressed against the inner peripheral surface of the housing hole 3d, the clip 80 and the groove part 61a may be arbitrarily configured without limitation to the above embodiment. A part of the clip 80 may bulge radially outward in the state before the holder 30 is assembled into the housing hole 3d, and the clip 80 may be contracted to bias the second holder 60 toward the inner peripheral surface of the housing hole 3d in assembling the holder 30 into the housing hole 3d.

For example, the wire diameter of the clip 80 and the depth (diameter) of the bottom part of the groove part 61a may change in the circumferential direction. A case where the depth of the bottom part of the groove part 61a changes is described as an example. As shown in FIG. 15, the groove part 61a is so formed that the diameter of the bottom part thereof becomes shallower with distance from the separation wall part 61b in the circumferential direction. In other words, a center of curvature of the bottom part of the groove part 61a is deviated toward the gear side in the third direction with respect to a center of curvature of the outer peripheral surface of the second holder body part 61 in the second holder 60. According to this, if the clip 80 is mounted into the groove part 61a, a part of the clip 80 mounted in a shallow part of the groove part 61a bulges radially outward from the groove part 61a.

In mounting the clip 80 into the groove part 61a and assembling the holder 30 into the housing hole 3d, the outer periphery of the clip 80 contacts the inner peripheral surface of the housing hole 3d. Thus, if the holder 30 is assembled into the housing hole 3d, the second holder body part 61 is pressed from the gear side having a shallow depth toward the opposite gear side by the inner periphery of the clip 80. In this way, as in the above embodiment, the holder 30 can be elastically supported by the clip 80 and the second holder 60 can be pressed against the inner peripheral surface of the housing hole 3d. In this case, the radius of curvature of the clip 80 and that of the bottom part of the groove part 61a may be equal. Similarly, in the case of changing the wire diameter of the clip 80 in the circumferential direction, the wire diameter in a part to be located on the gear side may be increased. In this case, the center of curvature of the outer periphery of the clip 80 is deviated toward the gear side in the third direction with respect to the outer peripheral surface of the second holder body part 61 with the clip 80 mounted in the groove part 61a. It should be noted that both the wire diameter of the clip 80 and the depth of the groove part 61a may be changed in the circumferential direction.

Figure 16:
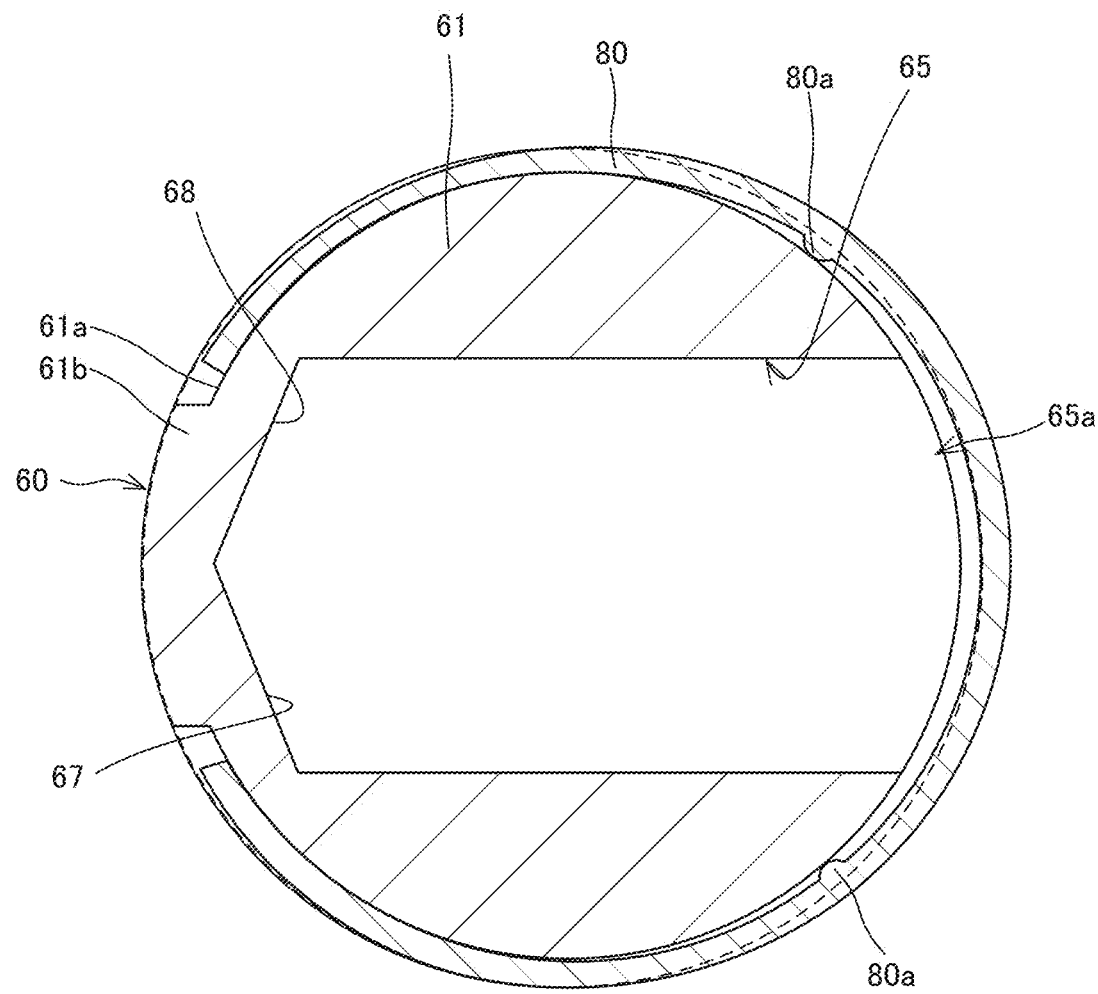
FIG. 16 is a sectional view showing a second modification of the holder according to the first embodiment of the present invention.
Figure 16:
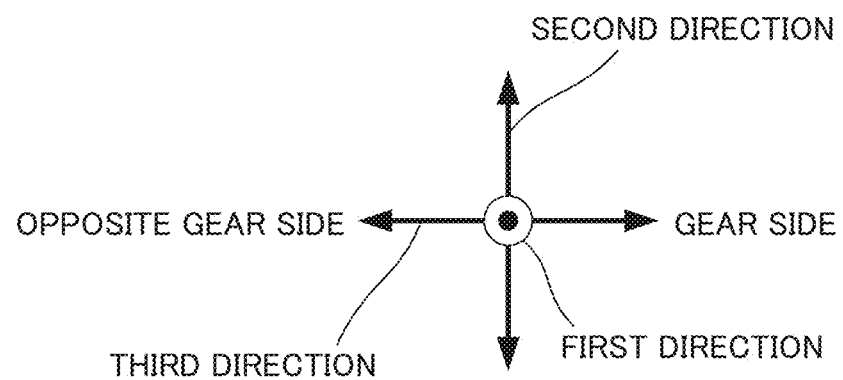
Figure 17:
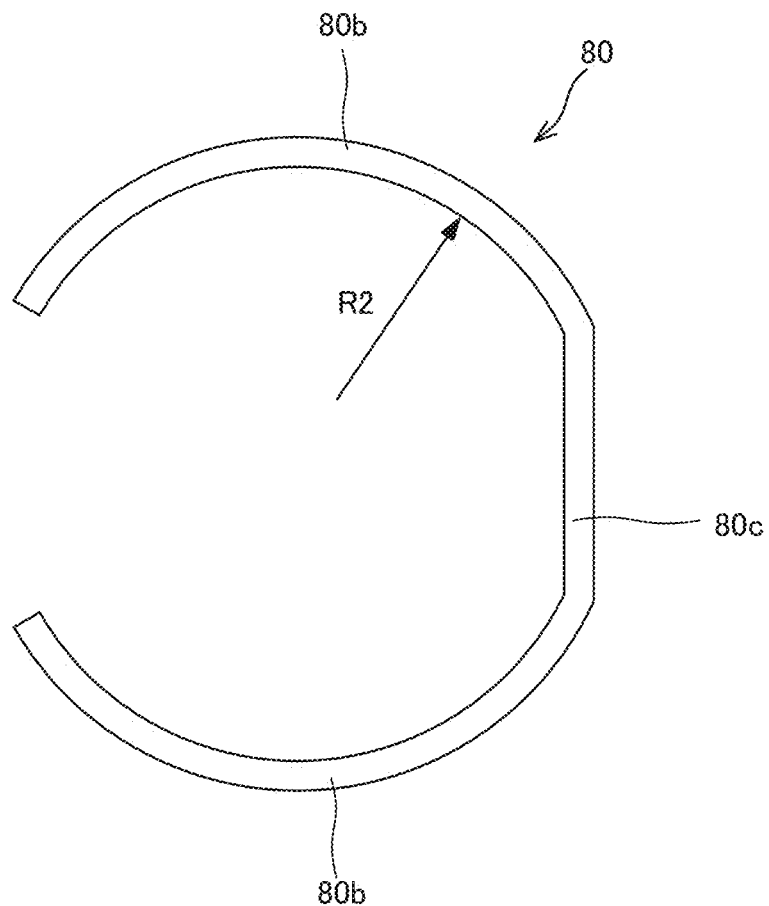
FIG. 17 is a sectional view of a third modification of the holder according to the first embodiment of the present invention showing a modification of the clip.

Further, raised parts 80a for causing the clip 80 to bulge radially outward may be provided on the inner peripheral surface of the clip 80 or the bottom part of the groove part 61a, for example, as shown in FIG. 16. In the case of being provided on the clip 80, the raised parts 80a are raised radially inwardly from the inner periphery of the clip 80 (see FIG. 16). Although not shown, the raised parts 80a are raised radially outwardly from the bottom part or inwardly from a side part of the groove part 61a in the case of being provided in the groove part 61a. By providing the raised parts 80a on the clip 80 or in the groove part 61a, the clip 80 is caused to bulge radially outward by the raised parts 80a if the clip 80 is mounted into the groove part 61a. In this way, as in the above embodiment, the holder 30 can be elastically supported by the clip 80 and the second holder 60 can be pressed against the inner peripheral surface of the housing hole 3d. The raised parts 80a are desirably provided on both sides in the circumferential direction of the outer peripheral opening part 65a in the receiving part 65 of the second holder 60 as in the above embodiment. The raised parts 80a may be provided both on the clip 80 and in the groove part 61a.

Further, the clip 80 and/or the groove part 61a may have an elliptical or another shape other than a perfect arc shape. As another shape, the clip 80 may include a pair of arcuate parts 80b having a radius of curvature R2 smaller than the radius of curvature R1 of the groove part 61a and a straight connecting part 80c connecting the pair of arcuate parts 80b, for example, as shown in FIG. 17. In this case, if the clip 80 is mounted into the groove part 61a, two boundary parts (connecting parts) of the pair of arcuate parts 80b and the connecting parts 80c bulge radially outward. Thus, the holder 30 is elastically supported in the gear case 3 by the two boundary parts bulging in the clip 80. Also in this case, effects similar to those of the above embodiment are achieved.

As described above, another configuration may be employed without limitation to the configuration in the above embodiment in the case of elastically supporting the holder 30 in the housing hole 3d.

Further, if the second holder 60 is pressed against the inner peripheral surface of the housing hole 3d by the elastic force of the clip 80, it is desirable that the clip 80 largely bulges at two positions on both sides in the circumferential direction of the second opening part 43b and elastic forces act on the holder 30 from two directions as in the above embodiment. According to this, the circular second holder 60 can be stably pressed toward the side opposite to the worm wheel 1 against the inner peripheral surface of the housing hole 3d. It should be noted that, without limitation to this, the clip 80 and the groove part 61a may be configured to receive elastic force(s) at one, three or more positions.

Next, another modification of the present embodiment is described.

In the above embodiment, the first holding part 42a of the first holder 40 can pass through the first holder opening part 63a of the second holder 60 and come into contact with the inner peripheral surface of the housing hole 3d through the first holder opening part 63a. In contrast, it is not essential that the second holder 60 includes the first and second holder opening parts 63a, 63b. That is, the second holder 60 may be such that the guide part 62 is formed into a hollow cylindrical shape having the pair of guide surfaces 62c, 62d. At least if the outer ring 11a of the second bearing 11 held by the first holder 40 directly contacts the pair of guide surfaces 62c, 62d, the configuration of the holder 30 can be made compact and the meshing accuracy of the worm wheel 1 and the worm shaft 2 can be improved.

Further, in the above embodiment, the spring 70 is held in a compressed state between the supporting part 50 of the first holder 40 and the receiving part 65 of the second holder 60. In contrast, the biasing force of the spring 70 may act on the second bearing 11 at least via the first holder 40. For example, the spring 70 may be held between the first holder 40 and the inner peripheral surface of the housing hole 3d of the gear case 3. Further, the second bearing 11 and the spring 70 may be configured such that the spring 70 is provided radially outwardly of the second bearing 11 without limitation to the configuration in which the spring 70 is separated in the axial direction of the second bearing 11.

Further, in the above embodiment, the first supporting part 51 includes the first seating surface 51a, the first side wall surfaces 51b, 51c and the first peripheral wall surface 51d. The second supporting part 52 includes the second seating surface 52a, the second side wall surfaces 52b, 52c and the second peripheral wall surface 52d. That is, the first and second supporting parts 51, 52 are constituted by the wall surfaces defining the spring housing recess part 55 for housing the spring 70. In contrast, the first and second supporting parts 51, 52 can be arbitrarily configured without limitation to the above configuration as long as the spring 70 can be supported to exert biasing forces in the first and second biasing directions. For example, the first and second supporting parts 51, 52 may be projections which are inserted into the spring 70 to support the inner periphery of the spring 70. In this case, the projections may be provided either on the supporting part 50 of the first holder 40 or in the receiving part 65 of the second holder 60.

According to the above first embodiment, the following effects are achieved.

In the power steering device 100, the second bearing 11 is guided to move by directly contacting the guide surfaces 62c, 62d of the first and second guide parts 62a, 62b in the second holder 60. Since the second bearing 11 is not guided to move via the first holder 40, but is directly guided by the first and second guide parts 62a, 62b in this way, it can be suppressed that the dimensional accuracy of the first holder 40 affects the meshing accuracy. Thus, the meshing accuracy of the worm wheel 1 and the worm shaft 2 can be improved.

Further, the spring 70 is held by the first and second holders 40, 60. The spring 70 does not bias the second bearing 11 from a radially outer side by being arranged side by side with the second bearing 11 in the radial direction, but biases the second bearing 11 via the first holder 40 by being arranged side by side with the second bearing 11 in the axial direction. Thus, the enlargement of the second bearing 11 in the radial direction can be prevented.

Further, the holder 30 includes the first supporting part 51 for supporting the spring 70 such that a biasing force is exerted in the first biasing direction and the second supporting part 52 for supporting the spring 70 such that a biasing force is exerted in the second biasing direction. Thus, regardless of whether the power steering device 100 is installed in a left-hand steering vehicle or in a right-hand steering vehicle, the spring 70 can be caused to exert a biasing force in a suitable direction corresponding to the position of the steering wheel by the common holder 30. Thus, the holder 30 needs not be manufactured for each vehicle type and the mold for manufacturing the holder 30 is commonly used, wherefore manufacturing cost can be reduced.

Further, since the holder 30 includes the projection 58, erroneous assembly can be easily detected if the spring 70 is supported by one supporting part not supposed to support the spring 70, out of the first and second supporting parts 51, 52.

Further, the first holder 40 includes the center hole 41b for avoiding the interference of the worm shaft 2, and the biasing direction of the spring 70 can be visually confirmed through the center hole 41b. Thus, even with the first and second holders 40, 60 assembled, erroneous assembly having a different biasing direction of the spring 70 can be easily detected by visual confirmation through the center hole 41b.

Further, in the holder 30, the second holder 60 includes the holder opening part 63 for allowing the passage of the holding part 42 of the first holder 40 and the second bearing 11, and the holding part 42 of the first holder 40 faces the inner peripheral surface of the housing hole 3d through the holder opening part 63. A movement of the first holder 40 is restricted by the contact of the first and second holding parts 42a, 42b with the inner peripheral surface of the housing hole 3d through the first and second opening parts 43a, 43b. Thus, in the holder 30, the first and second holding parts 42a, 42b of the first holder 40 are arranged side by side with the first and second guide parts 62a, 62b in the circumferential direction through the first and second opening parts 43a, 43b of the second holder 60. Since the first and second holders 40, 60 do not overlap in the radial direction of the second bearing 11 as just described, the configuration of the holder 30 can be made compact. Further, the meshing accuracy of the worm wheel 1 and the worm shaft 2 in the third direction is not affected by the dimensional accuracy of the second holder 60 and is, hence, further improved.

Further, in the holder 30, the first and second holders 40, 60 are locked by the clip 80 and the detachment of the first holder 40 and the second bearing 11 from the second holder 60 is restricted through the holder opening part 63. The clip 80 elastically supports the holder 30 in the housing hole 3d. In this way, the first and second holders 40, 60 can be locked by the single clip 80, a force for holding the holder 30 in the housing hole 3d can be ensured and the number of components can be reduced.

Further, in the holder 30, the second holder 60 is biased in the direction separating from the worm wheel 1 and pressed against the inner peripheral surface of the housing hole 3d by the elastic force of the clip 80. Since the biasing force of the spring 70 to bias the worm shaft 2 toward the worm wheel 1 is not affected by the elastic force of the clip 80 in this way, the worm shaft 2 can be stably biased.

Second Embodiment

Next, a second embodiment of the present invention is described with reference to FIGS. 18 and 19. The following description is centered on points of difference from the above first embodiment and the same components as those of the above first embodiment are denoted by the same reference signs and not described.

In the second embodiment, the structure for locking the first and second holders 40, 60 is different from that of the first embodiment. The locking member for locking the first and second holders 40, 60 is the C-shaped clip 80 in the first embodiment, whereas a holder 130 of the second embodiment includes an elastic ring 180 serving as the locking member instead of the clip 80. This is specifically described below. It should be noted that since the configuration other than the locking structure for the first and second holders 40, 60 is the same as in the first embodiment, the description and illustration thereof are omitted as appropriate.

Figure 18:
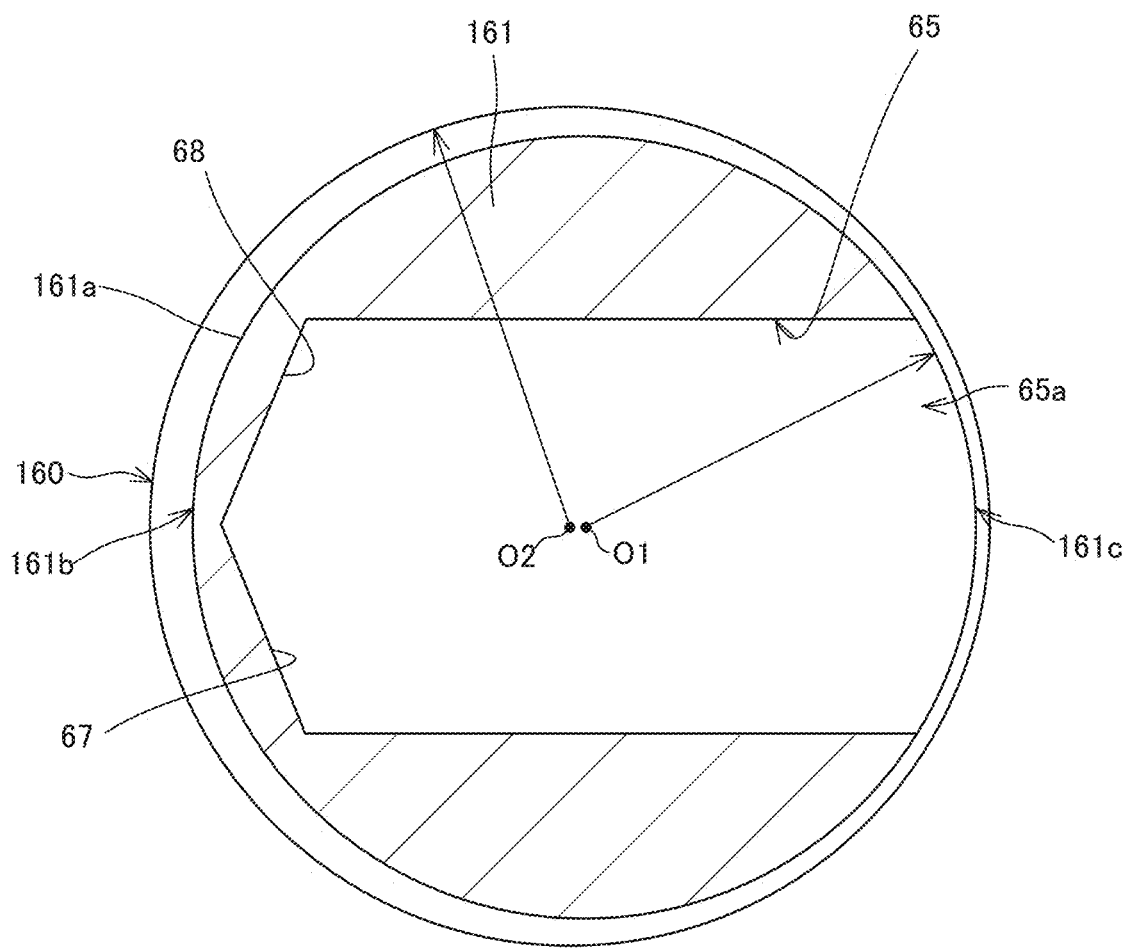
FIG. 18 is a sectional view of a second holder according to a second embodiment of the present invention.
Figure 18:
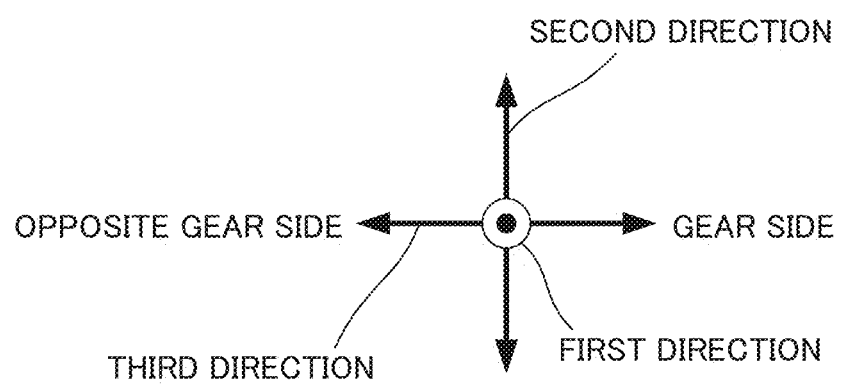
Figure 19:
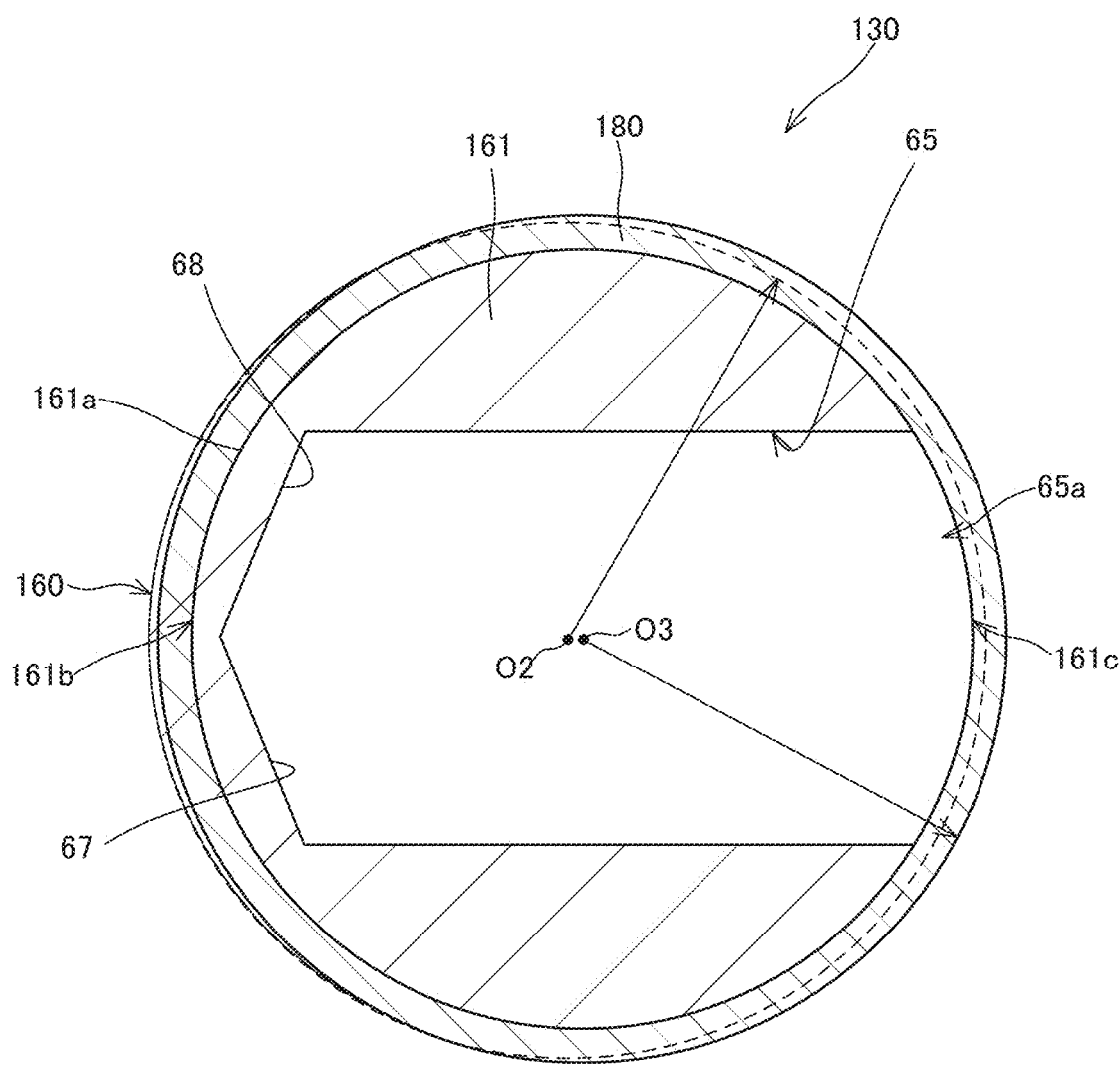
FIG. 19 is a sectional view showing the second holder and an elastic ring according to the second embodiment of the present invention.
Figure 19:
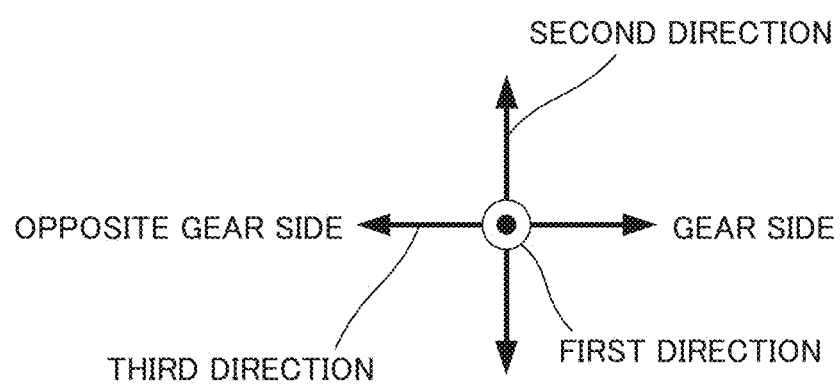

As shown in FIG. 18, an annular groove 161a having a circular ring shape is formed in the outer peripheral surface of a second holder body part 161 of a second holder 160. The annular groove 161a has an arcuate cross-section. A part of the annular groove 161a on an opposite gear side in a third direction with respect to a center of a second holder body part 161 serves as a deepest part 161b having a largest depth, and a part thereof on a gear side serves as a shallowest part 161c having a smallest depth. A depth of the annular groove 161a becomes gradually shallower from the deepest part 161b toward the shallowest part 161c. The annular groove 161a communicates with an outer peripheral opening part 65a of a receiving part 65 and is separated by the outer peripheral opening part 65a. Thus, a center of curvature O1 of a bottom part of the annular groove 161a is deviated toward the gear side in the third direction with respect to a center of curvature O2 of the outer peripheral surface of the second holder body part 161 in the second holder 160.

The elastic ring 180 is an O-ring made of resin and having a circular cross-section. A wire diameter of the elastic ring 180 is uniform. As shown in FIG. 19, with the elastic ring 180 mounted in the annular groove 161a, a center of curvature O3 of the outer periphery of the elastic ring 180 coincides with the center of curvature O1 of the annular groove 161a and is deviated toward the gear side in the third direction with respect to the center of curvature O2 of the outer peripheral surface of the second holder body part 161.

As in the first embodiment, by mounting the elastic ring 180 into the annular groove 161a with a first holder 40 assembled with the second holder 160, the escape of the first holder 40 from the second holder 160 through the outer peripheral opening part 65a is restricted. In this way, the first and second holders 40, 160 are locked by the elastic ring 180.

If the elastic ring 180 is mounted into the annular groove 161a, a part of the elastic ring 180 projects radially outward from the outer peripheral surface of the second holder body part 161. In the deepest part 161b of the annular groove 161a, the elastic ring 180 does not project from the outer peripheral surface of the second holder body part 161. On the contrary, the elastic ring 180 projects most in the shallowest part 161c.

In assembling the holder 130 into a housing hole 3d of a gear case 3, the part of the elastic ring 180 projecting radially outward from the annular groove 161a is pushed radially inwardly and compressed. Accordingly, an elastic force of the compressed elastic ring 180 acts on the second holder 160. The elastic ring 180 is most compressed in the shallowest part 161c and a compression amount decreases toward the deepest part 161b. Thus, the second holder 160 is biased toward an opposite gear side in the third direction to be separated from a worm wheel 1 by the compressed elastic ring 180. In this way, the holder 130 is elastically supported in the housing hole 3d by the elastic force of the elastic ring 180 as with the locking structure by the clip 80 in the first embodiment.

Further, the second holder body part 161 of the second holder 160 is pressed against the inner peripheral surface of the housing hole 3d by receiving the elastic force of the elastic ring 180. Thus, a power steering device 100 according to the second embodiment achieves effects similar to those achieved by the locking structure by the clip 80 in the first embodiment.

Next, a modification of the second embodiment is described.

In the second embodiment, the elastic ring 180 is formed to have a uniform wire diameter and the annular groove 161a is formed such that the depth thereof changes in the circumferential direction. In contrast, the wire diameter of the elastic ring 180 may be changed in the circumferential direction and the depth of the annular groove 161a may be uniform. Also in this case, as in the above embodiment, the center of curvature O3 of the outer peripheral surface of the elastic ring 180 mounted in the annular groove 161a is deviated with respect to the center of curvature O2 of the outer peripheral surface of the second holder body part 161. In this case, the elastic ring 180 needs to be so mounted that a part thereof having a large wire diameter is located on the gear side in order to press the second holder 160 toward the opposite gear side in the third direction against the inner periphery surface of the housing hole 3d. Thus, an assembling process is complicated, but effects similar to those of the above embodiment can be achieved. Further, both the depth of the annular groove 161a and the wire diameter of the elastic ring 180 may be changed in the circumferential direction.

Further, although illustration and detailed description are omitted since being similar to those of the first embodiment, raised parts 80a may be provided on the elastic ring 180 and/or in the annular groove 161a, the holder 130 may be elastically supported by the elastic ring 180 and the second holder 160 may be pressed against the inner peripheral surface of the housing hole 3d. Further, the elastic ring 180 may be formed to have another shape such as an elliptical shape other than a perfect circular shape.

According to the above second embodiment, effects similar to those of the first embodiment are achieved.

Third Embodiment

Next, a third embodiment of the present invention is described with reference to FIGS. 20 to 26. The following description is centered on points of difference from the first embodiment and the same components as those of the first embodiment are denoted by the same reference signs and not described.

Figure 20:
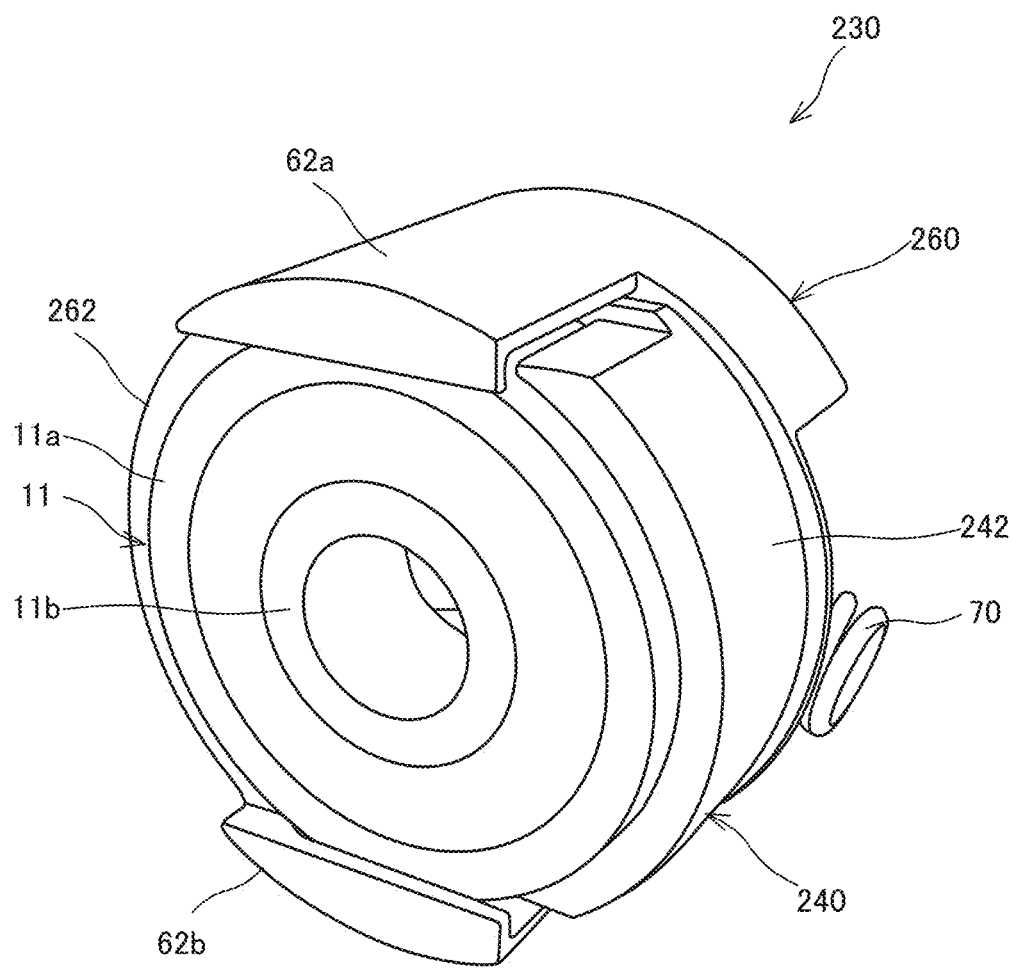
FIG. 20 is a front side perspective view showing a holder according to a third embodiment of the present invention.
Figure 20:
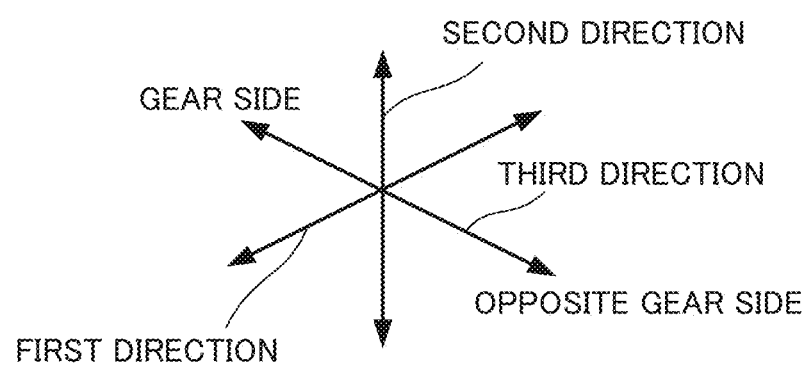
Figure 21:
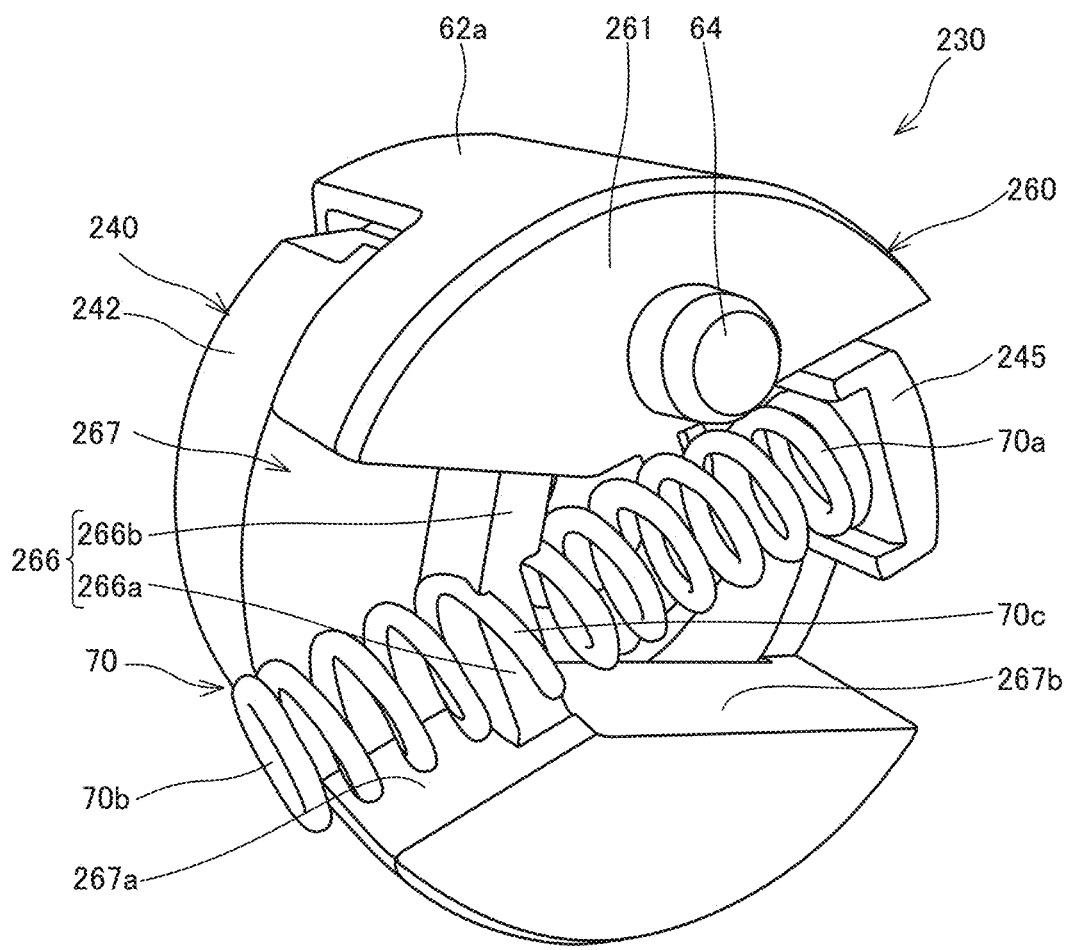
FIG. 21 is a back side perspective view showing the holder according to the third embodiment of the present invention.
Figure 21:
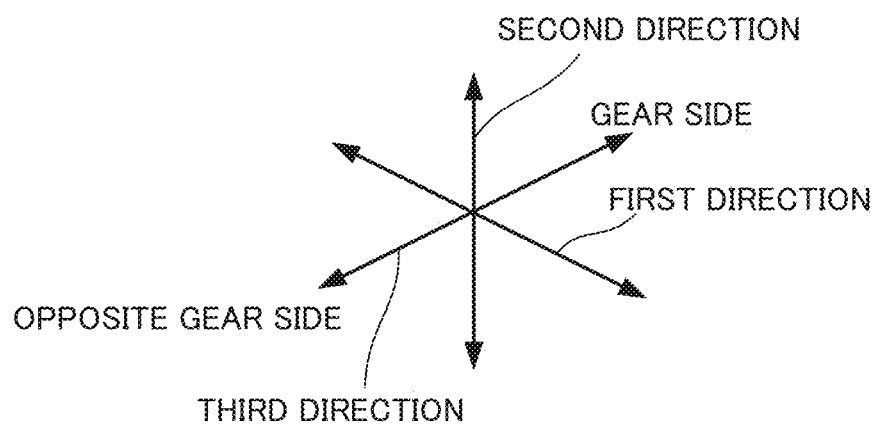

In the third embodiment, a holder 230 includes, as shown in FIGS. 20 and 21, a first holder 240 having a holding part 242 for holding a second bearing 11, a second holder 260 having a guide part 62 for guiding a movement of the second bearing 11 toward a worm wheel 1, and a spring 70 provided in a compressed state between the first and second holders 240, 260 for biasing the second bearing 11 toward the worm wheel 1 via the first holder 240.

Figure 22:
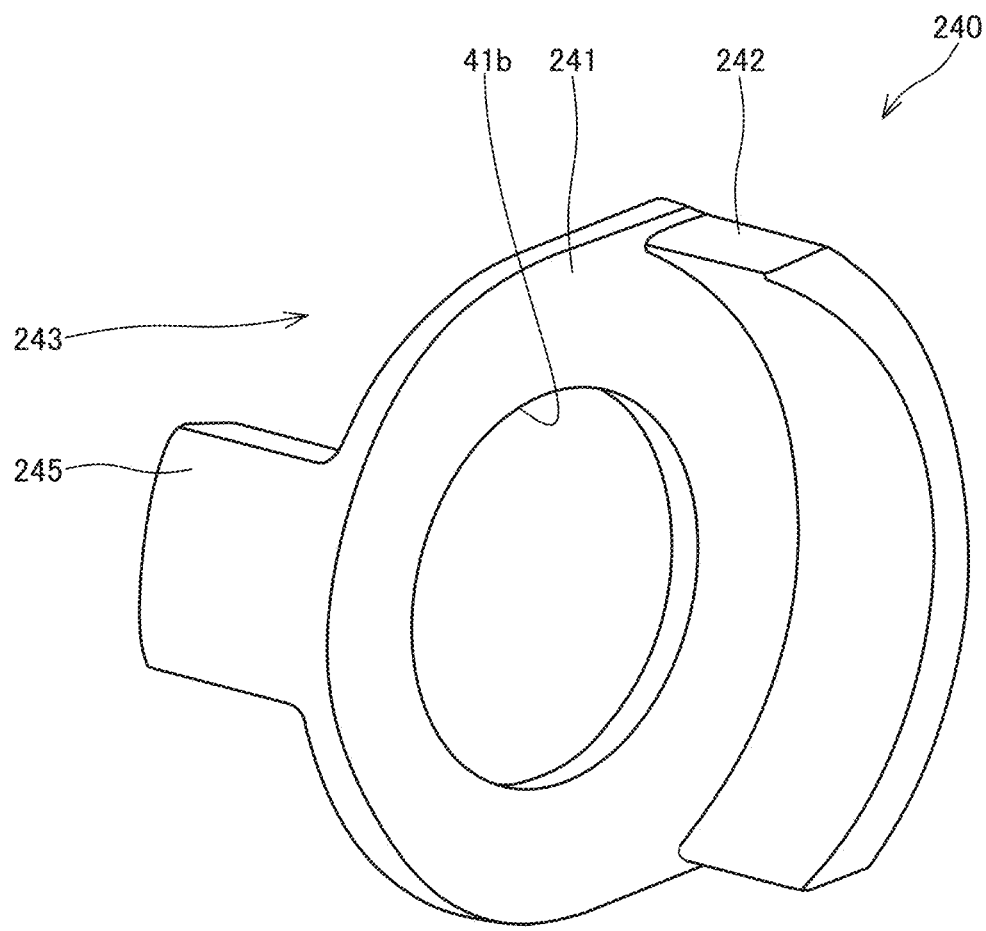
FIG. 22 is a front side perspective view showing a first holder according to the third embodiment of the present invention.
Figure 22:
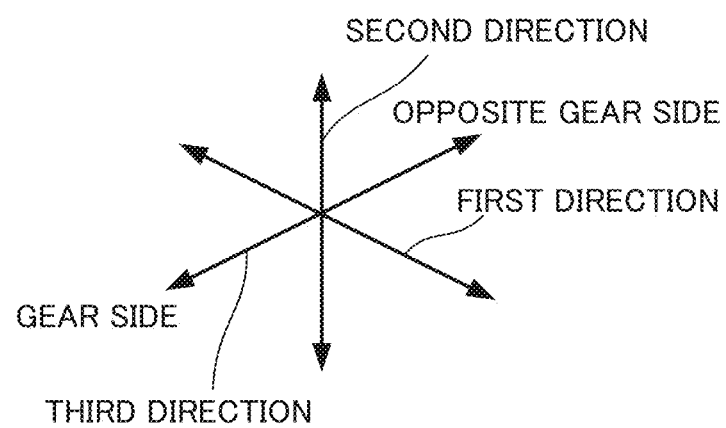
Figure 23:
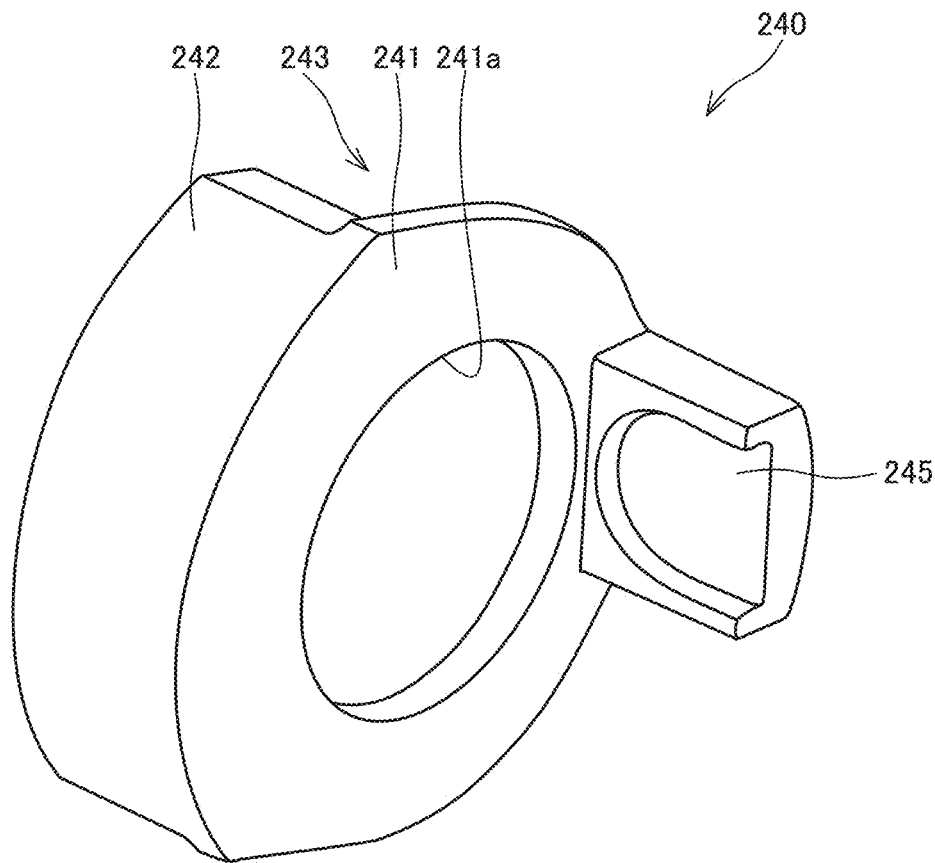
FIG. 23 is a back side perspective view showing the first holder according to the third embodiment of the present invention.
Figure 23:
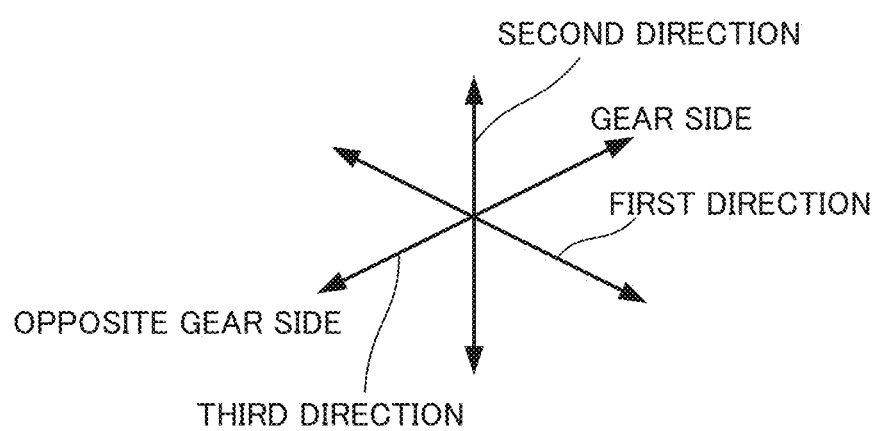

As shown in FIGS. 22 and 23, the first holder 240 includes a plate-like first holder body part 241, the holding part 242 provided on the first holder body part 241, an opening part 243 for exposing a part of the outer peripheral surface of an outer ring 11a of the second bearing 11, and a seating part 245 on which one end of the spring 70 is seated. As in the above first embodiment, the first holder body part 241 is formed with a center hole 41b.

As shown in FIGS. 20 and 22, the holding part 242 is a single wall part provided closer to an opposite gear side in a third direction than the second bearing 11. The holding part 242 projects from the first holder body part 241 along a center axis of the second bearing 11. A radially inner side of the holding part 242 is formed into such an arc shape as to correspond to the outer ring 11a of the second bearing 11, and a radially outer side thereof is formed into such an arc shape as to correspond to the inner peripheral surface of a housing hole 3d.

The opening part 243 is provided in a circumferential direction of the holding part 242. In the first holder 240, the holding part 242 is formed in a range of about 120°, and the opening part 243 is formed in the remaining range of 240°. The opening part 243 is formed to be open in inner and outer peripheral surfaces by cutting a circumferential part of a hollow cylindrical wall part. In other words, the first holder 240 of the third embodiment is formed by connecting the first and second opening parts 43a, 43b by an opening without providing the first holding part 42a in the first holder 40 of the first embodiment. The opening part 243 in the third embodiment also exposes the part of the outer peripheral surface of the outer ring 11a of the second bearing 11 held by the holding part 242 to outside.

The seating part 245 is provided continuously with the first holder body part 241 on a side opposite to the holding part 242 in the first holder body part 41. The seating part 245 is provided at a position on a side opposite to the holding part 242 across the center axis of the second bearing 11 in the third direction. That is, the holding part 242 is provided on an opposite gear side in the third direction and the seating part 245 is provided on the gear side with respect to the second bearing 11.

Figure 26:
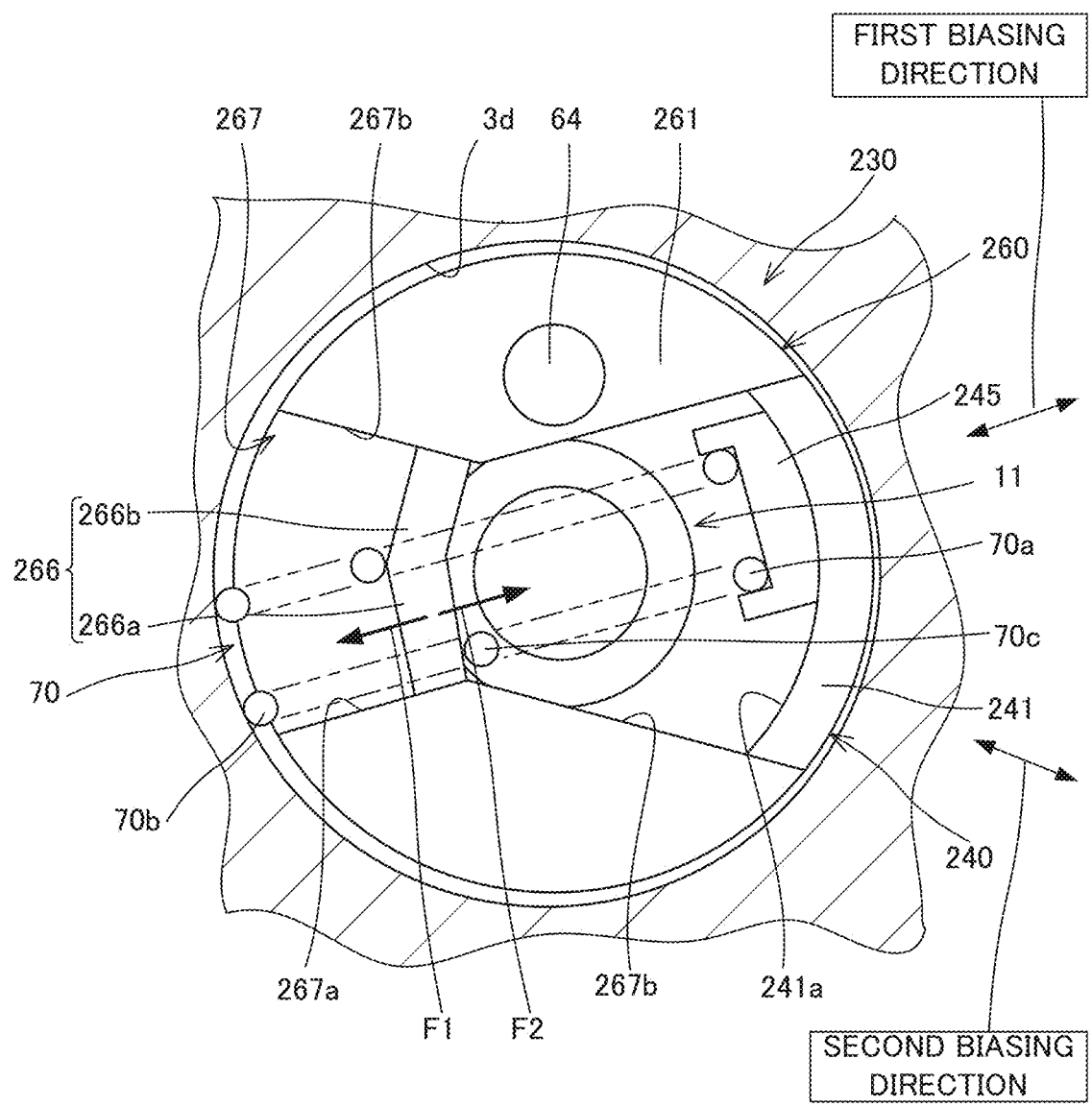
FIG. 26 is a sectional view showing a state where the holder according to the third embodiment of the present invention is incorporated in a gear case.
Figure 26:
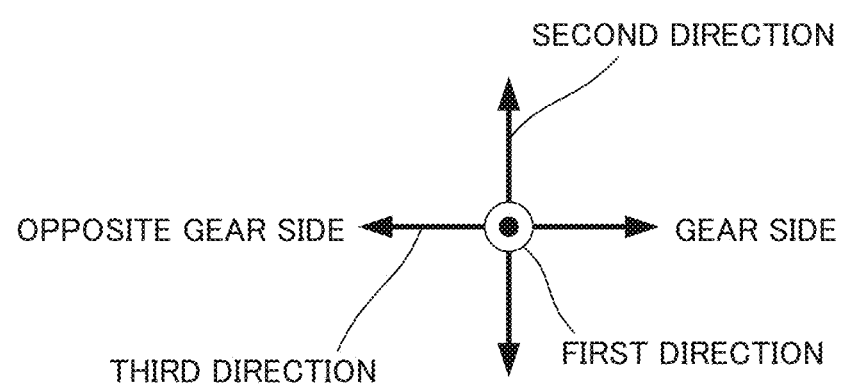

In the present embodiment, the spring 70 is supported to exert a biasing force in a first biasing direction by a spacer part 266 to be described later. Thus, as shown in FIGS. 23 and 26, the first holder 240 is provided with the single seating part 245 on which the spring 70 for exerting the biasing force in the first biasing direction is seated. Only the seating part 245 corresponding to a supporting direction of the spring 70 may be provided as shown in FIG. 23. Further, like the first and second receiving surfaces 67, 68 of the above first embodiment, the seating part 245 may be configured such that one end of the spring 70 is seated regardless of in which of the first and second biasing directions the spring 70 exerts the biasing force.

Figure 24:
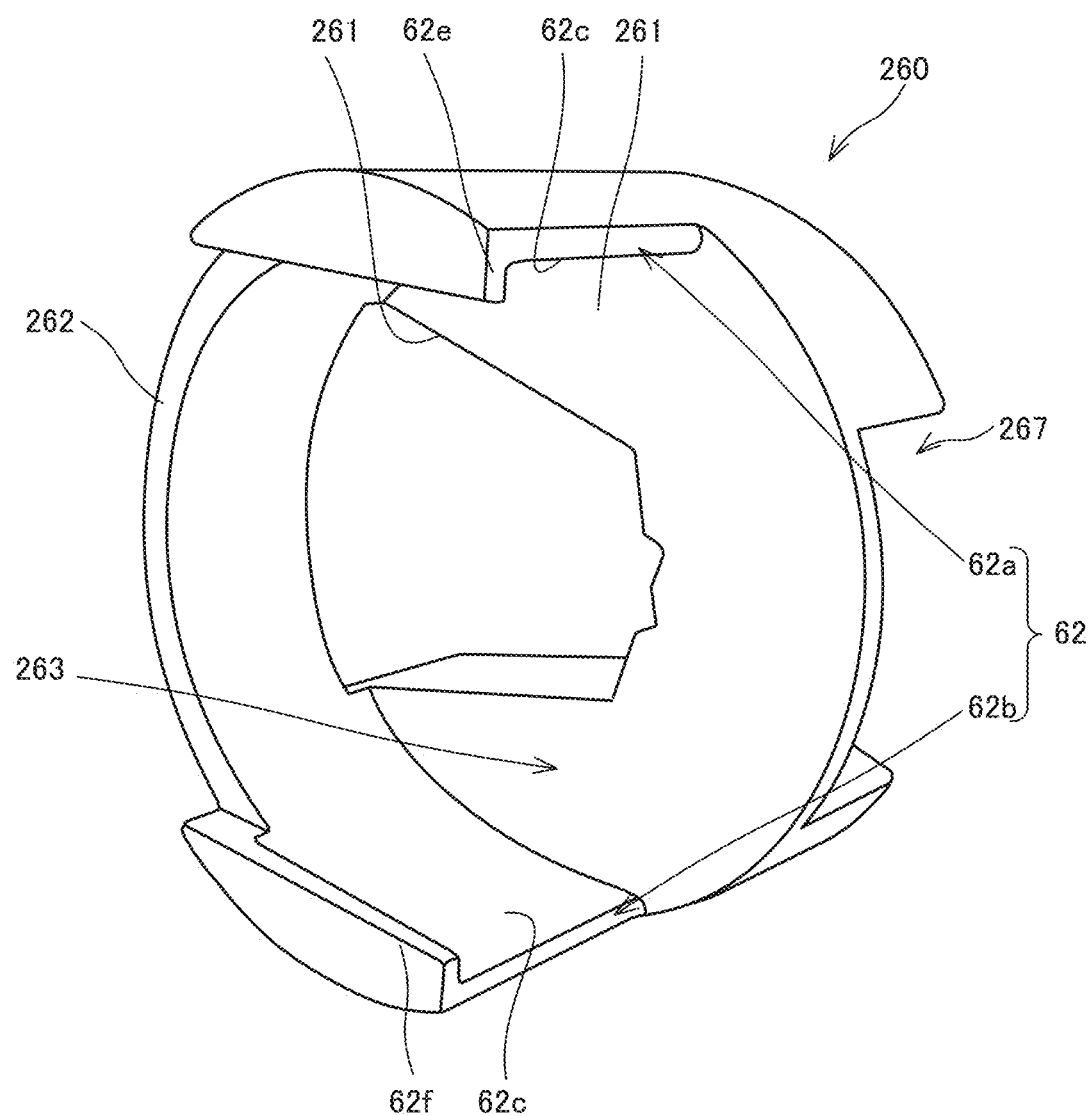
FIG. 24 is a front side perspective view showing a second holder according to the third embodiment of the present invention.
Figure 24:
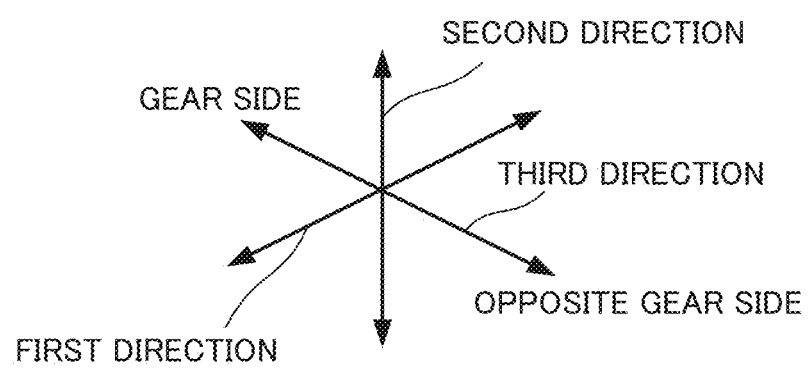
Figure 25:
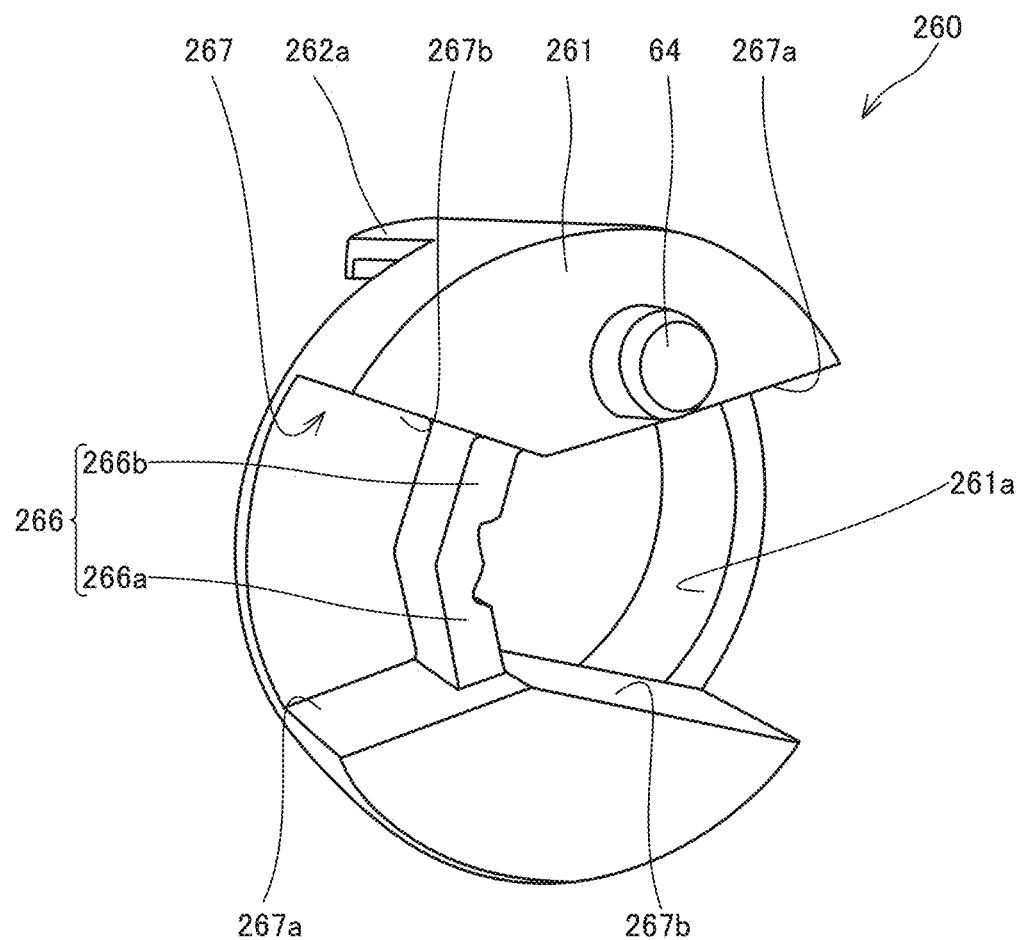
FIG. 25 is a back side perspective view showing the second holder according to the third embodiment of the present invention.
Figure 25:
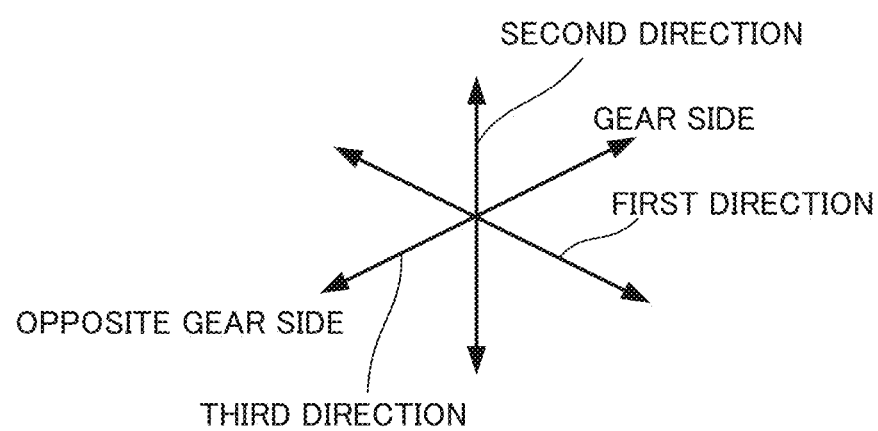

As shown in FIGS. 24 and 25, the second holder 260 includes a disk-like second holder body part 261, a guide part 62 provided on the second holder body part 261, an auxiliary holding part 262 connected to the guide part 62 to hold the second bearing 11 together with the holding part 42 of the first holder 40, the spacer part 266 on which an intermediate part 70c between both end parts 70a, 70b of the spring 70 is seated, and a positioning protrusion 64 to be inserted into a positioning hole 3e of the gear case 3.

The second holder body part 261 includes a passage hole 261a for allowing the passage of the seating part 245 of the first holder 240 and a cutout 267 formed on a side opposite to the guide part 62 and the auxiliary holding part 262 in an axial direction and extending in the third direction.

The passage hole 261a communicates with the cutout 267. The seating part 245 of the first holder 240 is inserted into the cutout 267 of the second holder body part 261 through the passage hole 261a.

The spring 70 is housed into the cutout 267. As shown in FIGS. 25 and 26, the cutout 267 is defined by a first wall surface 267a extending in the first biasing direction and a second wall surface 267 extending in the second biasing direction. The cutout 267 can house the spring 70 regardless of in which of the first and second biasing directions a biasing force is exerted.

The guide part 62 includes a first guide part 62a and a second guide part 62b as in the above first embodiment. The first and second guide parts 62a, 62b respectively include a pair of guide surfaces 62c, 62d provided parallel to each other and claw parts 62e, 62f. Also in the present embodiment, a part of the outer ring 11a of the second bearing 11 exposed through the opening part 243 of the first holder 240 directly contacts the first and second guide parts 62a, 62b.

The auxiliary holding part 262 is an arcuate wall part provided closer to the gear side in the third direction than the center axis of the second bearing 11. The second bearing 11 is held by the holding part 242 of the first holder 240 and the auxiliary holding part 262 of the second holder 260. The auxiliary holding part 262 connects the first and second guide parts 62a, 62b in the circumferential direction.

A holder opening part 263 is provided between the first and second guide parts 62a, 62b in the circumferential direction on a side opposite to the auxiliary holding part 262. The holding part 242 of the first holder 240 faces the inner peripheral surface of the housing hole 3d (see FIG. 26) through the holder opening part 263. As just described, also in the present embodiment, the first and second holders 240, 260 do not overlap in the radial direction between the second bearing 11 and the inner peripheral surface of the housing hole 3d as in the above first embodiment. Thus, the holder 230 can have a compact configuration.

The spacer part 266 is provided in the cutout 267 to connect the first and second wall surfaces 267a, 267b constituting the cutout 267. The intermediate part 70c of the spring 70 housed in the cutout 267 is seated on the spacer part 266. The spacer part 266 includes a first spacer part 266a perpendicular to the first biasing direction and a second spacer part 266b perpendicular to the second biasing direction. The biasing direction of the spring 70 can be changed depending on which of the first and second spacer parts 266a, 266b the spring is seated on. As just described, in the third embodiment, the spacer part 266 (first and second spacer parts 266a, 266b) is equivalent to a supporting part (first and second supporting parts) for supporting the spring 70 such that the biasing force is exerted in the first and second biasing directions.

As shown in FIG. 26, one end part 70a of the spring 70 is seated on the seating part 245 of the first holder 240, and the other end part 70b is seated on the inner peripheral surface of the housing hole 3d. The spring 70 is held in a compressed state between the one end part 70a and the intermediate part 70c and between the other end part 70b and the intermediate part 70c, respectively. Since the intermediate part 70c is seated on the spacer part 266 in the spring 70, an axial force acting on the one end part 70a does not act on the other end part 70b. The opposite also holds true. Thus, in the spring 70, one spring action is exhibited between the one end part 70a and the intermediate part 70c and one spring action is exhibited between the intermediate part 70c and the other end part 70b, whereby two independent spring actions are apparently exhibited.

In the present embodiment, such a biasing force as to bring the holding part 242 of the first holder 240 and the auxiliary holding part 262 of the second holder 260 closer to each other is caused to act by the spring 70 between the one end part 70a and the intermediate part 70c. Thus, the holding part 242 and the auxiliary holding part 262 are pressed against the outer ring 11a of the second bearing 11. In this way, the first holder 240, the second holder 260 and the second bearing 11 are integrated without being separated. That is, a part of the spring 70 between the one end part 70a and the intermediate part 70c functions as a locking member for locking the first and second holders 240, 260.

Further, the spring 70 between the one end part 70a and the intermediate part 70c exerts a biasing force for biasing the first holder 240 toward the gear side with respect to the second holder 260. Thus, the spring 70 functions also as a biasing member.

Furthermore, a part of the spring 70 between the other end part 70b and the intermediate part 70c exhibits a function of elastically supporting the holder 230 in the housing hole 3d.

As just described, in the present embodiment, the biasing member and the locking member are integrally configured as one spring 70.

Here, the spring 70 between the one end part 70a and the intermediate part 70c exerts a biasing force in a direction toward the opposite gear side (hereinafter, referred to as a "first biasing force F1") to the second holder 260 as shown in FIG. 26. The spring 70 between the other end part 70b and the intermediate part 70c exerts a biasing force in a direction toward the gear side (hereinafter, referred to as a "second biasing force F2") to the second holder 260. If the first biasing force F1 is larger than the second biasing force F2, the second holder 260 is biased to move toward the opposite gear side, wherefore the worm shaft 2 cannot be reliably biased toward the gear side. Accordingly, the holder 230 is configured such that the second biasing force F2 is larger than the first biasing force F1 to bias the worm shaft 2 and the second bearing 11 toward the gear side. Specifically, the shape and mounting structure of the spring 70 such as the position of the intermediate part 70c of the spring 70 to be seated on the spacer part 266 (in other words, compression amounts between the one end part 70a and the intermediate part 70c and between the other end part 70b and the intermediate part 70c), the pitch of the spring 70 and a winding diameter of the spring 70 are properly set so that the second biasing force F2 is larger than the first biasing force F1. In this way, a movement of the second holder 260 toward the opposite gear side is prevented, and the worm shaft 2 and the second bearing 11 can be more reliably biased toward the gear side.

In assembling the holder 230, the first and second holders 240, 260 are so assembled that the seating part 245 of the first holder 240 is inserted through the passage hole 261a of the second holder 260. Further, the second bearing 11 is housed between the holding part 242 of the first holder 240 and the auxiliary holding part 262 of the second holder 260. Subsequently, the intermediate part 70c of the spring 70 is seated on the first spacer part 266a, and the one end part 70a is compressed by a predetermined amount and seated on the seating part 245. The holder 230 is assembled in this way. In the third embodiment, the first and second holders 240, 260 are assembled along the axial direction of the second bearing 11 unlike the above first embodiment.

To assemble the holder 230 into the housing hole 3d, the holder 230 is housed into the housing hole 3d while the other end part 70b of the spring 70 is pushed and compressed to insert the positioning protrusion 64 into the positioning hole 3e. In this way, the holder 230 is elastically supported in the housing hole 3d by the biasing force between the intermediate part 70c and the other end part 70b of the spring 70.

Since the second bearing 11 directly contacts the guide part 62 of the second holder 260 also in the third embodiment as described above, the meshing accuracy of the worm wheel 1 and the worm shaft 2 is not affected by the dimensional accuracy of the first holder 240.

Further, since the spring 70 exhibits both functions as the biasing member for biasing the second bearing 11 via the first holder 240 and a locking member for locking the first and second holders 240, 260, the number of components can be reduced.

It should be noted that since the other end of the spring 70 is seated on the inner peripheral surface of the housing hole 3d, the spring 70 does not exhibit a function of pressing the second holder 260 against the inner peripheral surface of the housing hole 3d. Besides that, the spring 70 exhibits effects similar to those of the above first embodiment.

The configurations, functions and effects of the embodiments of the present invention are summarized below.

The power steering device 100 includes the worm shaft 2 configured to rotate as the electric motor 7 is driven, the worm wheel 1 meshed with the worm shaft 2, the second bearing 11 configured to rotatably support the tip side of the worm shaft 2, the gear case 3 configured to house the worm shaft 2 and the holder 30, 130, 230 housed in the housing hole 3d provided in the gear case 3 and configured to house the second bearing 11. The holder 30, 130, 230 includes the first holder 40, 240 having the holding part 42, 142 configured to hold the outer periphery of the second bearing 11 and the opening part 43, 243 configured to expose a part of the outer periphery of the second bearing 11, the second holder 60, 160, 260 having the guide part 62 configured to guide a movement of the second bearing 11 toward the worm wheel 1 as the outer periphery of the second bearing 11 comes into contact with the guide part 62 through the opening part 43, 243, and the spring 70 configured to bias the second bearing 11 toward the worm wheel 1 via the first holder 40, 240.

In this configuration, the second bearing 11 directly contacts the guide part 62 of the second holder 60, 160, 260 and is guided to move. Since the second bearing 11 is not guided to move via the first holder 40, 240, but is directly guided by the guide part 62 as just described, it is suppressed that the dimensional accuracy of the first holder 40, 240 affects the meshing accuracy. Therefore, the meshing accuracy of the worm shaft 2 and the worm wheel 1 can be improved in the power steering device 100.

The power steering device 100 includes the holder opening part 63 configured to allow the passage of the second bearing 11 and the holding part 42 of the first holder 40 in a guiding direction of the guide part 62 to guide the second bearing 11.

In this configuration, the second bearing 11 held by the first holder 40 can be inserted into the second holder 60 through the holder opening part 63. Since an assembling direction of the first holder 40 and the second bearing 11 into the second holder 60 and the biasing direction by the biasing member (moving direction of the second bearing 11) coincide in this way, assemblability is improved.

In the power steering device 100, the holding part 42, 242 of the first holder 40, 240 faces the inner peripheral surface of the housing hole 3d through the holder opening part 63, 263.

In this configuration, a movement of the holding part 42, 242 of the first holder 40, 240 is not restricted due to contact with the second holder 60, 260, but the holding part 42, 242 is directly facing the inner peripheral surface of the housing hole 3d. Thus, it is suppressed that the dimensional accuracy of the second holder 60, 260 in the moving direction of the second bearing 11 affects the meshing accuracy of the worm shaft 2 and the worm wheel 1. Therefore, the meshing accuracy can be further improved.

In the power steering device 100, the guide part 62 of the second holder 60 is composed of the first and second guide parts 62a, 62b having the guide surfaces 62c, 62d configured to respectively contact the outer peripheral surface of the second bearing 11 and provided parallel to each other across the center axis of the second bearing 11, the holder opening part 63 of the second holder 60 is composed of the first and second holder opening parts 63a, 63b respectively provided between the first and second guide parts 62a, 62b in the circumferential direction, the holding part 42 of the first holder 40 is composed of the first and second holding parts 42a, 42b provided to face each other across the center axis of the second bearing 11, and the first and second holding parts 42a, 42b are respectively provided side by side with the first and second guide parts 62a, 62b in the circumferential direction through the first and second opening parts 43a, 43b.

In this configuration, since the configuration of the first holder 40 and that of the second holder 60 do not overlap in the radial direction of the second bearing 11 between the second bearing 11 and the inner peripheral surface of the housing hole 3d, the holder 30 can have a compact configuration.

In the power steering device 100, the spring 70 is held in a compressed state between the first and second holders 40, 60.

In the power steering device 100, the first holder 40 includes the supporting part 50 provided side by side with the holding part 42 in the axial direction of the second bearing 11 to support the spring 70, the second holder 60 includes the receiving part 65 provided side by side with the guide part 62 in the axial direction of the second bearing 11 to support the biasing member, and the spring 70 is held in a compressed state between the supporting part 50 of the first holder 40 and the receiving part 65 of the second holder 60.

In these configurations, the spring 70 is provided side by side with the second bearing 11 in the axial direction to bias the second bearing 11 in the radial direction. Thus, the configuration of the power steering device 100 can be made compact in the radial direction of the second bearing 11.

Further, the following invention is included in this specification.

The power steering device 100 includes the worm shaft 2 configured to rotate as the electric motor 7 is driven, the worm wheel 1 meshed with the worm shaft 2, the second bearing 11 configured to rotatably support the tip side of the worm shaft 2, the gear case 3 provided with the housing hole 3d for housing the worm shaft 2 and the holder 30, 130, 230 configured to house the second bearing 11. The holder 30, 130, 230 includes the first holder 40, 240 configured to hold the second bearing 11, the second holder 60, 160, 260 having the guide part 62 configured to guide a movement of the second bearing 11 toward the worm wheel 1, and the spring 70 provided in a compressed state between the first holder 40, 240 and the second holder 60, 160, 260 and configured to bias the first holder 40, 240 toward the worm wheel 1. The second holder 60, 160, 260 includes the holder opening part 63, 263 configured to allow the passage of the second bearing 11 and the first holder 40, 240 in the guiding direction of the guide part 62 to guide the second bearing 11, and the first holder 40, 240 faces the inner peripheral surface of the housing hole 3d through the holder opening part 63, 263.

In this configuration, the first holder 40, 140 faces the inner peripheral surface of the housing hole 3d through the holder opening part 63, 263 of the second holder 60, 160, 260. Since the first holder 40, 240 and the second holder 60, 160, 260 are configured not to overlap in the guiding direction of the guide part 62 as just described, the holder 30, 130, 230 can have a compact configuration. Therefore, the power steering device 100 can be reduced in size.

In the power steering device 100, the holder 30, 130, 230 further includes the locking member (clip 80, elastic ring 180, spring 70) for locking the first and second holders 40, 140, 240, 60, 160, 260 the locking member (clip 80, elastic ring 180, spring 70) elastically supports the holder 30, 130, 230 in the housing hole 3d.

In this configuration, since the holding force for holding the holder 30 in the housing hole 3d by the locking member (clip 80, elastic ring 180, spring 70) is ensured, the number of components can be reduced.

In the power steering device 100, the second holder 60, 160 is biased in the direction separating from the worm wheel 1 and pressed against the inner peripheral surface of the housing hole 3d by the locking member (clip 80, elastic ring 180).

In this configuration, since the biasing force of the spring 70 is not affected by the elastic force by the locking member (clip 80, elastic ring 180), the biasing force of the spring 70 can be stabilized.

In the power steering device 100, the second holder 60 includes the arcuately extending groove part 61a in the outer peripheral surface, and the locking member is the arcuate clip 80 to be housed into the groove part 61a.

In the power steering device 100, the wire diameter of the clip 80 changes in the circumferential direction.

In the power steering device 100, the depth of the groove part 61a changes in the circumferential direction.

In the power steering device 100, at least one of the groove part 61a and the clip 80 is provided with the raised parts 80a for causing the clip 80 to bulge radially outward.

In the power steering device 100, the clip 80 includes the pair of arcuate parts 80b formed into an arc shape and the straight connecting part 80c connecting the pair of arcuate parts 80b.

In the power steering device 100 according to the second embodiment, the second holder 160 includes the annular groove 161a in the outer peripheral surface and the locking member is the elastic ring 180 having a circular ring shape and to be housed into the annular groove 161a.

In the power steering device 100 according to the second embodiment, the depth of the annular groove 161a changes in the circumferential direction.

In the power steering device 100 according to the third embodiment, the biasing member and the locking member are configured as the integrally formed spring 70, the one end part 70a of the spring 70 is seated on the first holder 240 and the other end part 70b thereof is seated on the inner peripheral surface of the housing hole 3d, the first holder 240 includes the holding part 242 configured to hold the second bearing 11 and the seating part 245 configured such that the one end part 70a of the spring 70 is seated thereon, the second holder 260 includes the auxiliary holding part 262 configured to hold the second bearing 11 together with the holding part 242 and the spacer part 266 configured such that the intermediate part 70c of the spring 70 between the one end part 70a and the other end part 70b is seated thereon, and the holding part 242 and the auxiliary holding part 262 are pressed against the second bearing 11 and the first and second holders 240, 260 are locked to each other by the biasing force between the one end part 70a and the intermediate part 70c of the spring 70.

In this configuration, since the spring 70 exhibits the functions of both the biasing member and the locking member, the number of components can be reduced.

The power steering device 100 includes the worm shaft 2 configured to rotate as the electric motor 7 is driven, the worm wheel 1 meshed with the worm shaft 2, the second bearing 11 configured to rotatably support the tip side of the worm shaft 2, the gear case 3 configured to house the worm shaft 2, and the holder 30, 130, 230 arranged in the gear case 3 and configured to house the second bearing 11. The holder 30, 130, 230 includes the first holder 40, 240 configured to hold the second bearing 11, the second holder 60, 160, 260 having the guide part 62 configured to guide a movement of the second bearing 11 toward the worm wheel 1, the spring 70 provided in a compressed state between the first holder 40, 240 and the second holder 60, 160, 260, and the supporting part (supporting part 50, spacer part 266) provided on either one of the first holder 40, 240 and the second holder 60, 160, 260 to support the spring 70. The supporting part (supporting part 50, spacer part 266) includes the first supporting part (first supporting part 51, first spacer part 266a) capable of supporting the spring 70 to exert a biasing force in the first biasing direction, and the second supporting part (second supporting part 52, second spacer part 266b) capable of supporting the spring 70 to exert a biasing force in the second biasing direction different from the first biasing direction. The spring 70 is supported by either one of the first supporting part (first supporting part 51, first spacer part 266a) and the second supporting part (second supporting part 52, second spacer part 266b).

In this configuration, the biasing member is provided between the first holder 40, 240 and the second holder 60, 160, 260 and the supporting part (supporting part 50, spacer part 266) is provided on either one of the first holder 40, 240 and the second holder 60, 160, 260. Further, the biasing direction by the spring 70 can be changed depending on which of the first supporting part (first supporting part 51, first spacer part 266a) and the second supporting part (second supporting part 52, second spacer part 266b) supports the spring 70. Since the biasing direction of the spring 70 can be changed by the configuration of the holder 30, 130, 230 in this way, the common holder 30, 130, 230 can be used in each of a left-hand steering vehicle and a right-hand steering vehicle, and the gear case 3 needs not be processed to share a device configuration. Therefore, the manufacturing cost of the power steering device 100 can be reduced.

In the power steering device 100, the supporting part 50 is provided on the first holder 40, the spring 70 is housed in the spring housing recess part 55 provided in the supporting part 50, the spring housing recess part 55 includes the first housing recess part 56 defined by the first supporting part 51 and the second housing recess part 57 defined by the second supporting part 52, and the first and second housing recess parts 56, 57 are provided to intersect each other.

In the power steering device 100, either one of the first and second holders 40, 60 is formed with the erroneous assembly preventing part configured to obstruct the assembling of the first and second holders 40, 60 if one supporting part not supposed to support the biasing member, out of the first and second supporting parts 51, 52, supports the biasing member.

In this configuration, an error in the assembling direction of the biasing member can be easily detected during the assembling of the holder 30.

In the power steering device 100, the first holder 40, 240 is formed with the center hole 41b configured to avoid interference with the worm shaft 2, and the biasing member faces the center hole 41b and is supported by the first supporting part (first supporting part 51, first spacer part 266a) or the second supporting part (second supporting part 52, second spacer part 266b).

In this configuration, even after the holder 30, 130, 230 is assembled, an error in the assembling direction of the spring 70 can be easily detected by visually confirming the biasing direction of the spring 70 through the center hole 41b.

Embodiments of this invention were described above, but the above embodiments are merely examples of applications of this invention, and the technical scope of this invention is not limited to the specific constitutions of the above embodiments.

In each of the above embodiments, the worm wheel 1 is provided on the output shaft of the steering shaft. Instead of this configuration, the worm wheel 1 may be provided on a pinion shaft provided separately from the steering shaft and meshed with the rack shaft.

This application claims priority based on Japanese Patent Application No. 2017-167732 filed with the Japan Patent Office on Aug. 31, 2017, the entire contents of which are incorporated into this specification.

The invention claimed is:

1. A power steering device, comprising:
   a worm shaft configured to rotate as an electric motor is driven;
   a worm wheel meshed with the worm shaft;
   a bearing configured to rotatably support a tip side of the worm shaft;
   a gear case configured to house the worm shaft; and
   a holder housed in a housing hole provided in the gear case, the holder housing the bearing,
   wherein the holder includes:
   a first holder having a holding part and an opening part, the holding part being configured to hold an outer periphery of the bearing, the opening part being configured to expose a part of the outer periphery of the bearing;
   a second holder having a guide part configured to guide a movement of the bearing toward the worm wheel as the outer periphery of the bearing comes into direct contact with the guide part through the opening part; and
   a biasing member configured to bias the bearing toward the worm wheel via the first holder.

2. The power steering device according to claim 1, wherein:
   the second holder includes a holder opening part configured to allow the bearing and the holding part of the first holder to pass through thereof in a guiding direction in which the guide part guides the bearing.

3. The power steering device according to claim 2, wherein:
   the holding part of the first holder is configured to face an inner peripheral surface of the housing hole through the holder opening part.

4. The power steering device according to claim 2, wherein:
   the guide part of the second holder is composed of a first guide part and a second guide part having guide surfaces respectively, each of the guide surfaces being configured to contact an outer peripheral surface of the bearing, the guide surfaces of the first guide part and the second guide part being provided parallel to each other across a center axis of the bearing,
   the holder opening part of the second holder is composed of a first holder opening part and a second holder opening part respectively provided between the first guide part and the second guide part in a circumferential direction,
   the holding part of the first holder is composed of a first holding part and a second holding part provided to face each other across the center axis of the bearing, and
   the first holding part and the second holding part are respectively provided side by side with the first guide part and the second guide part in the circumferential direction through the first opening and the second opening.

5. The power steering device according to claim 1, wherein:
   the biasing member is held in a compressed state between the first holder and the second holder.

6. The power steering device according to claim 5, wherein:
   the first holder includes a supporting part provided side by side with the holding part in an axial direction of the bearing, the supporting part being configured to support the biasing member,
   the second holder includes a receiving part provided side by side with the guide part in the axial direction of the bearing, the receiving part being configured to support the biasing member, and
   the biasing member is held in a compressed state between the supporting part of the first holder and the receiving part of the second holder.

* * * * *